US011507295B2

(12) United States Patent
Myers et al.

(10) Patent No.: US 11,507,295 B2
(45) Date of Patent: Nov. 22, 2022

(54) BACKUP, RESTORATION, AND MIGRATION OF COMPUTER SYSTEMS

(71) Applicant: MicroStrategy Incorporated, Vienna, VA (US)

(72) Inventors: Clayton Myers, Oak Hill, VA (US);
Andrew Smith, Oakton, VA (US);
Timothy Lang, McLean, VA (US);
Scott Rowley, Falls Church, VA (US);
Shreyas Shah, Vienna, VA (US);
Martin Lucius Bonica, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/557,713

(22) Filed: Aug. 30, 2019

(65) Prior Publication Data

US 2021/0064262 A1 Mar. 4, 2021

(51) Int. Cl.
*G06F 12/00* (2006.01)
*G06F 13/00* (2006.01)
(Continued)

(52) U.S. Cl.
CPC ........... *G06F 3/0647* (2013.01); *G06F 3/067* (2013.01); *G06F 3/0614* (2013.01);
(Continued)

(58) Field of Classification Search
CPC ...... G06F 3/0647; G06F 3/0614; G06F 3/067; G06F 11/1451; G06F 11/1466; G06F 11/1469
(Continued)

(56) References Cited

U.S. PATENT DOCUMENTS 6,334,158 B1 * 12/2001 Jennyc ................. G06F 8/20
713/1
6,339,795 B1 * 1/2002 Narurkar ............. G06F 16/258
709/246

(Continued)

OTHER PUBLICATIONS

U.S. Office Action in U.S. Appl. No. 16/542,023, dated Mar. 12, 2021, 15 pages.

(Continued)

*Primary Examiner* — Sheng Jen Tsai
(74) *Attorney, Agent, or Firm* — Fish & Richardson P.C.

(57) ABSTRACT

Methods, systems, and apparatus, including computer programs encoded on computer-storage media, for backup, restoration, and migration of computer systems. In some implementations, data from a first server environment is obtained. A data package is generated that includes configuration data, data objects, and/or metadata from the first server environment organized in a predetermined arrangement. Data indicating (i) a destination on which to deploy the archived data from the first server environment and (ii) one or more characteristics of the destination is received. Mapping data that specifies a mapping of elements in the predetermined arrangement to elements of server environments having the one or more characteristics is accessed. Server environment data derived from the data package is deployed, the server environment data being deployed to the destination and arranged at the destination in a manner specified by the mapping data.

20 Claims, 10 Drawing Sheets

(51) Int. Cl.
  *G06F 3/06* (2006.01)
  *G06F 11/14* (2006.01)
(52) U.S. Cl.
  CPC ...... *G06F 11/1451* (2013.01); *G06F 11/1466* (2013.01); *G06F 11/1469* (2013.01)
(58) Field of Classification Search
  USPC ........................................................ 711/162
  See application file for complete search history.

(56) References Cited

U.S. PATENT DOCUMENTS

| | | | |
|---|---|---|---|
| 6,691,245 B1 | 2/2004 | DeKoning | |
| 7,784,049 B1* | 8/2010 | Gandler | G06F 9/455 718/1 |
| 7,917,617 B1 | 3/2011 | Ponnapur et al. | |
| 8,200,637 B1* | 6/2012 | Stringham | G06F 11/1451 707/670 |
| 8,285,681 B2* | 10/2012 | Prahlad | G06F 3/0631 707/640 |
| 9,189,294 B2 | 11/2015 | Considine et al. | |
| 9,270,449 B1* | 2/2016 | Tribble | H04L 9/0838 |
| 9,367,305 B1 | 6/2016 | Kumar et al. | |
| 9,674,294 B1* | 6/2017 | Gonthier | H04L 67/08 |
| 9,767,312 B2 | 9/2017 | Sahoo et al. | |
| 9,928,210 B1 | 3/2018 | Zhang et al. | |
| 9,959,104 B2 | 5/2018 | Chen et al. | |
| 9,965,261 B2 | 5/2018 | Chen et al. | |
| 9,986,427 B2* | 5/2018 | Kimpe | H04L 67/2842 |
| 10,002,247 B2 | 6/2018 | Suarez et al. | |
| 10,007,509 B1 | 6/2018 | Quershi et al. | |
| 10,101,985 B1 | 10/2018 | Prakash et al. | |
| 10,169,023 B2 | 1/2019 | Ciano et al. | |
| 10,191,778 B1 | 1/2019 | Yang et al. | |
| 10,241,778 B2 | 3/2019 | Emeis et al. | |
| 10,244,034 B2 | 3/2019 | Joshi et al. | |
| 10,261,782 B2 | 4/2019 | Suarez et al. | |
| 10,310,949 B1 | 6/2019 | Chakraborty et al. | |
| 10,318,280 B2* | 6/2019 | Islam | G06F 11/14 |
| 10,356,214 B2 | 7/2019 | Joshi et al. | |
| 10,389,582 B1 | 8/2019 | Fakhouri et al. | |
| 11,023,270 B2 | 6/2021 | Mahajan et al. | |
| 11,288,053 B2 | 3/2022 | Myers et al. | |
| 2002/0157089 A1* | 10/2002 | Patel | H04L 67/2804 717/178 |
| 2008/0109448 A1* | 5/2008 | Aboel-Nil | G06Q 10/107 |
| 2008/0243660 A1* | 10/2008 | Amemiya | G06Q 40/02 705/35 |
| 2009/0070462 A1 | 3/2009 | Saenz et al. | |
| 2012/0117620 A1* | 5/2012 | Cassidy | H04W 4/60 726/3 |
| 2013/0080514 A1* | 3/2013 | Gupta | G06F 9/505 709/203 |
| 2013/0339299 A1 | 12/2013 | Muller et al. | |
| 2014/0020048 A1* | 1/2014 | Snodgrass | G06F 21/10 726/1 |
| 2014/0089033 A1* | 3/2014 | Snodgrass | G06Q 10/06316 705/7.26 |
| 2015/0019488 A1 | 1/2015 | Balch et al. | |
| 2015/0326432 A1* | 11/2015 | Fujie | H04L 67/1097 709/222 |
| 2015/0373097 A1* | 12/2015 | Konkus | H04L 67/142 709/203 |
| 2016/0044040 A1* | 2/2016 | Caffary, Jr. | G06F 21/6209 726/4 |
| 2016/0055067 A1 | 2/2016 | Bensinger | |
| 2016/0139887 A1* | 5/2016 | Pudiyapura | G06F 8/447 717/106 |
| 2016/0335106 A1* | 11/2016 | Behere | G06F 9/45558 |
| 2016/0335108 A1* | 11/2016 | Ryu | G06F 9/45558 |
| 2016/0350205 A1 | 12/2016 | Acharya et al. | |
| 2017/0090972 A1* | 3/2017 | Ryu | G06F 9/45558 |
| 2017/0147319 A1 | 5/2017 | Riek et al. | |
| 2017/0154017 A1 | 6/2017 | Kristiansson et al. | |
| 2017/0177860 A1 | 6/2017 | Suarez et al. | |
| 2017/0185488 A1 | 6/2017 | Kumarasamv et al. | |
| 2017/0300311 A1 | 10/2017 | Lopez et al. | |
| 2017/0315795 A1 | 11/2017 | Keller | |
| 2018/0013616 A1* | 1/2018 | Abadi | H04L 41/0813 |
| 2018/0075086 A1 | 3/2018 | Yam et al. | |
| 2018/0088926 A1 | 3/2018 | Abrams | |
| 2018/0088935 A1 | 3/2018 | Church et al. | |
| 2018/0095778 A1 | 4/2018 | Avdelott et al. | |
| 2018/0095973 A1 | 4/2018 | Huang et al. | |
| 2018/0136931 A1 | 5/2018 | Hendrich et al. | |
| 2018/0157516 A1 | 6/2018 | Kristiansson et al. | |
| 2018/0173502 A1 | 6/2018 | Biskup et al. | |
| 2018/0173522 A1* | 6/2018 | Hamill | G06F 8/60 |
| 2018/0205652 A1 | 7/2018 | Saxena | |
| 2018/0285199 A1 | 10/2018 | Mitkar et al. | |
| 2018/0285210 A1 | 10/2018 | Mitkar et al. | |
| 2018/0285353 A1 | 10/2018 | Rao et al. | |
| 2018/0341471 A1 | 11/2018 | Stefanov et al. | |
| 2019/0034313 A1 | 1/2019 | Vedurumudi et al. | |
| 2019/0050680 A1 | 2/2019 | Waugh et al. | |
| 2019/0095254 A1 | 3/2019 | Rao | |
| 2019/0109857 A1* | 4/2019 | Caffary, Jr. | H04L 63/083 |
| 2019/0132329 A1 | 5/2019 | Verberkt et al. | |
| 2019/0163559 A1 | 5/2019 | Takahashi et al. | |
| 2019/0208031 A1 | 7/2019 | Bennet et al. | |
| 2019/0230130 A1 | 7/2019 | Beckman et al. | |
| 2019/0235897 A1 | 8/2019 | Goel | |
| 2019/0236844 A1* | 8/2019 | Balasian | G06T 11/60 |
| 2019/0260716 A1 | 8/2019 | Lerner | |
| 2019/0278669 A1 | 9/2019 | Mueller-Wicke et al. | |
| 2019/0303541 A1 | 10/2019 | Reddy et al. | |
| 2019/0354389 A1 | 11/2019 | Du et al. | |
| 2019/0392045 A1 | 12/2019 | De Lima Junior et al. | |
| 2020/0067763 A1 | 2/2020 | Vytla | |
| 2020/0099773 A1* | 3/2020 | Myers | H04L 67/1095 |
| 2020/0125482 A1* | 4/2020 | Smith | G06F 8/427 |
| 2020/0356806 A1 | 11/2020 | Li et al. | |
| 2020/0394120 A1 | 12/2020 | Salmi et al. | |
| 2021/0042141 A1 | 2/2021 | De Marco et al. | |
| 2021/0048995 A1 | 2/2021 | Myers et al. | |
| 2021/0048998 A1 | 2/2021 | Myers et al. | |
| 2021/0049002 A1 | 2/2021 | Myers et al. | |

OTHER PUBLICATIONS

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.

docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kabernetes-the-difference-between-containers-and-virtual-machines/, 8 pages.

Edureka.co [online], "Docker tutorial—Introduction to docker & containerization," 2017, retrieved on Oct. 25, 2019, retrieved from URL <https://www.edureka.co/blog/docker-tutorial>, 10 pages.

Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.

Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.

Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

linuxize.com [online], "How to Remove Docker Containers, Images, Volumes, and Networks," Oct. 2018, retrieved on Oct. 25, 2019,

(56) References Cited

OTHER PUBLICATIONS retrieved from URL <https://linuxize.com/post/how-to-remove-docker-images-containers-volumes-and-networks/#remove-one-or-more-containers>, 11 pages.

Ma et al., "Efficient service handoff across edge servers via docker container migration author:," 2017, SEC '17: Proceedings of the Second ACM/IEEE Symposium on Edge Computing, 11:1-13.

MicroStrategy.com [online], "Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.

Singh et al., "Container-based microservice architecture for cloud applications," May 2017, 2017 International Conference on Computing, Communication and Automation (ICCCA), 847-52.

Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.

Tao et al., "Dynamic Resource Allocation Algorithm for Container-based Service Computing"; 2017 IEEE 13th International Symposium on Autonomous Decentralized Systems—2017 IEEE, 62-7.

Tuton, "Deploy A MongoDB replica set using the IBM Cloud Kubernetes Service," IBM Developer, Mar. 15, 2018, 14 pages.

Wikipedia.org [online], "Docker(software)," Mar. 2013, retrieved on Oct. 25, 2019, retrieved from URL <https://en.wikipedia.org/wiki/Docker_(software)>, 8 pages.

Wikipedia.org [online], "OS-level virtualization," Aug. 2006, retrieved on Oct. 25, 2019, retrieved from URL <https://en.wikipedia.org/wiki/OS-level_virtualization>, 4 pages.

Wikipedta.org [online], "System Image," Feb. 2013, retrieved Oct. 25, 2019, retrieved from URL <https://en.wikipedia.org/wiki/System_image>, 2 pages.

Wong, "What's the Difference Between Containers and Virtual Machines?," Jul. 15, 2016, Electronic Design, retrieved from URL <http://electronicdesign.com/dev-tools/what-s-difference-between-containers-and-virtualmachines>, 3 pages.

www.en.wikipedia.org [online], "Online Analytical Processing" Mar. 2018, retrieved on Mar. 19, 2020, retrieved from URL <https://en.wikipedia.org/wiki/Online_analytical_processing>, 14 pages.

www2.microstategy.com [online], "MicroStrategy Intelligence Server," Apr. 2019, retrieved on Oct. 25, 2019, retrieved from URL https://www2.microstategy.com/producthelp/10.4/ProjectDesignGuide/WebHelp/Lang_1033/Content/ProjectDesign/MicroStategy_Intelligence_Server.htm, 2 pages.

Xu et al., "Mining Container Image Repositories tor Software Configuration and Beyond"; 2018 ACM/IEEE 40th International, 4 pages.

Notice of Allowance in U.S. Appl. No. 16/542,023, dated Dec. 2, 2021, 6 pages.

Office Action in U.S. Appl. No. 16/542,023, dated Aug. 20, 2021, 14 pages.

\* cited by examiner

Backup

① ② ③

Locate Content

We will try to locate all of the content that you choose to backup. You can manually select the location as well.

We are locating the content you choose to backup. This process might take several minutes.

Metadata Database ✓ Search Complete
📀 10.8 Dev Metadata   Not This one Change
Username                Password
[ ]                     [ ]

Verify

Dossier Collaboration Database (MongoDB) ○ Searching content...

Cubes ○ Searching content...

Caches ○ Searching content...

Usher Server ○ Searching content...

Back                                            Next

BACKUP, RESTORATION, AND MIGRATION OF COMPUTER SYSTEMS

TECHNICAL FIELD

The present specification relates to backup, restoration, and migration of computer systems.

BACKGROUND

To avoid data loss, data from servers and other computer systems should be backed up so the data can be restored if necessary. It is often desirable that executable software such as operating systems and applications are backed up in this process.

SUMMARY

In some implementations, a system backs up a software and data of a computer system, such as a server environment, to create an archive. The archive can be generated in a standardized, universal format, so that archives created for different configurations and versions of a software platform are stored in a consistent way. This can help ensure that configuration settings, dependencies, metadata, and other elements are all preserved. The system can back up server environments provided by different hardware platforms and configurations. For example, the system may be capable of backing up server environments provided by on-premises servers or by cloud-computing-based platforms. The system can also restore or migrate server environments to hardware platforms having the same or different configuration as the original server environment.

The system may provide a user interface so that a user can initiate the backup process. Through the user interface, the user can select a backup operation, a restore operation, or migrate operation. Where the user selects a backup operation, the user may be provided a list of server environments available to be backed up or an empty field, in which the user can enter the server environment to back up. In some implementations, through the user interface, the user can select a customer and the server environments available for selection are those belonging to the customer. The user interface may also provide the user a list of modes from which the user can choose. For example, the modes may include a manual mode, a semi-automatic mode, an automatic mode, and a cloud mode. Depending on the mode selected, the user may be required to enter in additional or different information.

In some implementations, the system restores a previously backed up server environment to a destination platform. The system can restore a server environment to a variety of platforms. For example, a destination platform may be an on-premises computer system or may be a cloud provider. The system can restore a stored server environment to the same platform from which it was backed up, or can restore the stored server environment to a different platform. For example, a server environment may be backed up from a locally connected host computer and restored to a cloud provider. In restoring a stored server environment, the system can convert the stored server environment data from a universal format to a format specific to the destination platform.

The system may provider a user interface so that a user can initiate the restoration process. Through the user interface, the user can select a backup operation, a restore operation, or migrate operation. Where the user selects a restore operation, the user may be provided a list of server environments that have been previously backed up. The user may also be provided a list of platforms that can serve as the destination. In some implementations, through the user interface, the user can select a customer and the server environments available for restoration are those that have been backed up for that customer.

In some implementations, the system migrates a server environment existing on a first platform to a second platform. The system can migrate a server environment to and from a variety of platforms. For example, these platforms may be on-premises computer systems or may be cloud providers, or a combination of an on-premises computer system and a cloud provider. In migrating a server environment, the system can convert the server environment data from a format specific to the first platform to a format specific to the second platform. In some implementations, the system first converts the server environment data to a universal format before converting it to a format specific to the second platform.

The system may provider a user interface so that a user can initiate the migration process. Through the user interface, the user can select a backup operation, a restore operation, or migrate operation. Where the user selects a migrate operation, the user may be provided a list of server environments that are available for migration or an empty field, in which the user can enter the server environment to migrate. The user may also be provided a list of platforms that can serve as the destination. In some implementations, through the user interface, the user can select a customer and the server environments available for migration are those belonging to that customer.

In one general aspect, a method includes: obtaining, by one or more computers, data from a first server environment, the data includes configuration data indicating a configuration of the first server environment, data objects used by the first server environment, and at least some metadata corresponding to one or more of the data objects; generating, by one or more computers, a data package that includes the configuration data, the data objects, and the metadata being organized in a predetermined arrangement; receiving, by one or more computers, data indicating (i) a destination on which to deploy the archived data from the first server environment and (ii) one or more characteristics of the destination; accessing, by one or more computers, mapping data that specifies a mapping of elements in the predetermined arrangement to elements of server environments having the one or more characteristics; and deploying, by one or more computers, server environment data derived from the data package, the server environment data being deployed to the destination and arranged at the destination in a manner specified by the mapping data.

Implementations may include one or more of the following features. For example, in some implementations, the first server environment is provided by a first server system, and where the destination is a second server system that has one or more characteristics that are different from the first server system that provides the first server environment. In these implementations, the process of generating the data package and deploying the server environment data derived from the data package translates the configuration data from a form used in the first server system to a different form used by the second server system.

In some implementations, the one or more characteristics of the second server system that are different from the first server system include a different hardware configuration, a different network topology, a different server type, a different operating system, or a different software version.

In some implementations, generating data package includes rearranging the data from the first server environment to conform to the predetermined arrangement within the data package.

In some implementations, the method includes: obtaining data indicating one or more characteristics of the first server environment; and selecting, from among multiple sets of mapping data, a set of mapping data that maps elements of the first server environment to the predetermined arrangement. In these implementations, generating the data package includes using the selected set of mapping data to convert the data from the first server environment to a standardized form in the data package.

In some implementations, the multiple sets of mapping data each correspond to a different software version, the sets of mapping data respectively indicating a correspondence of data for the corresponding software versions and a same standardized arrangement of data.

In some implementations, the method includes obtaining data indicating a second software version for deploying a server environment from the data package, where the second software version is different from a software version used in the first server environment. In these implementations, where accessing the mapping data includes selecting, from among the multiple sets of mapping data, a set of mapping data indicating a correspondence of data for the second software version and the standardized arrangement of data.

In some implementations, the first server environment is arranged such that: the first server environment is provided by an on-premises server system and the destination server environment is provided by a cloud computing platform; the first server environment is provided by a cloud computing platform and the destination server environment is provided by a cloud computing platform; the first server environment is provided by a cloud computing platform and the destination server environment is provided by an on-premises server system; or the first server environment is provided by an on-premises server system and the destination server environment is provided by an on-premises server system.

In some implementations, generating the data package includes: identifying non-standard characteristics of the first server environment by comparing the data from the first server environment with reference data representing a reference configuration of a server environment.

In some implementations, the data of the first server environment has a first format; and the generated data package has a second format different from the first format.

In some implementations, the one or more characteristics of the destination include one or more of an operating system, a build version of an enterprise application, a processor type, a processor configuration, a network topology, a storage configuration, or an application programming interface.

In some implementations, generating the data package includes comparing settings of the server system to a set of reference settings and storing, in the archive, settings identified as different from the corresponding settings in the set of reference settings.

In some implementations, generating the data package includes generating a ledger of elements of an application of the first server environment that are different from a reference configuration of the application.

In some implementations, the data objects include at least one of OLAP data cubes, caches, database dumps, software images, or plugins.

In some implementations, the first server environment includes multiple applications and/or services, and the server environment data stored at the destination is configured to replicate a configuration of each of the applications and/or services from the first server environment at the destination.

In some implementations, the data from the first server environment includes data for a specific application of the first server environment; where the data package includes data for the specific application, arranged in the predetermined arrangement; where deploying the server environment data includes deploying data for the specific application to substantially replicate, at the destination, a configuration of the specific application at the first server environment.

In some implementations, the specific application is a first version of the specific application; where the method includes receiving an indication of a second version of the specific application to be used in a server environment at the destination, the second version being different from the first version, and the second version providing a different set of functionality compared to the first version; where deploying the server environment data includes converting settings indicated by the data package to a set of settings for the second version of the specific application.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 5A-5C are diagrams illustrating example interfaces.

Like reference numbers and designations in the various drawings indicate like elements.

DETAILED DESCRIPTION

Figure 1A:
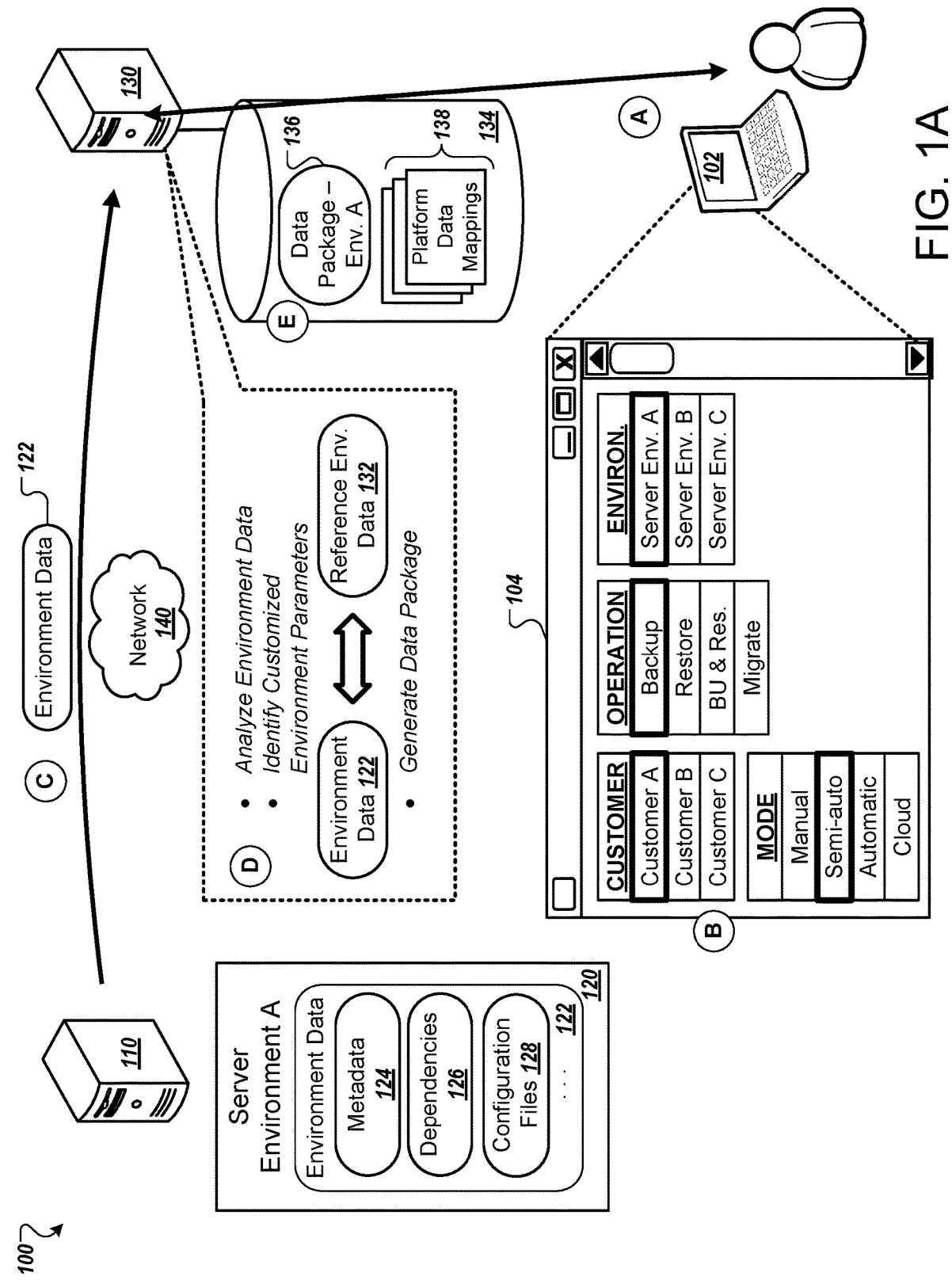
FIG. 1A is a diagram showing an example of backing up a server environment.
Figure 1B:
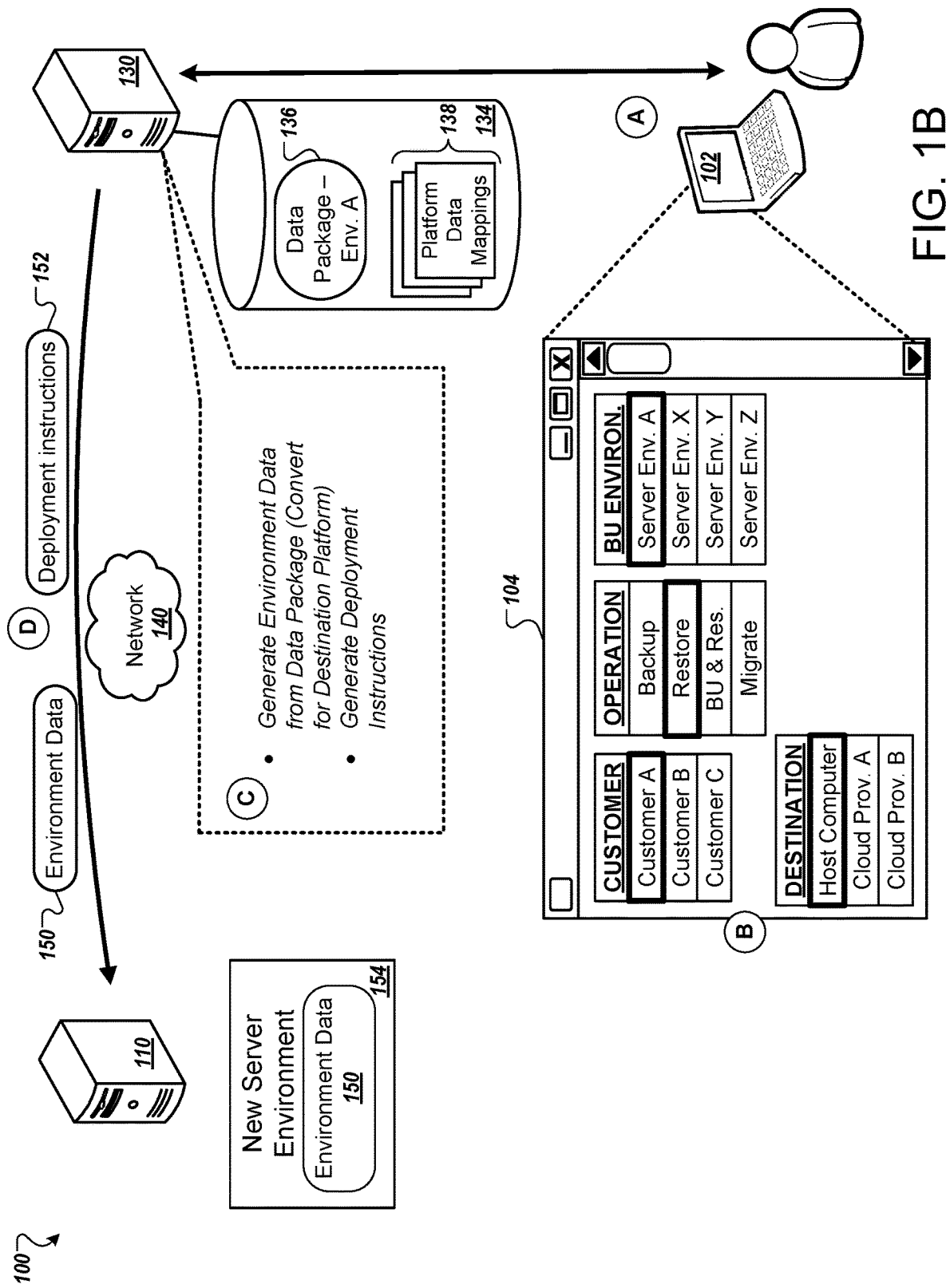
FIG. 1B is a diagram showing an example of restoring a server environment.
Figure 1C:
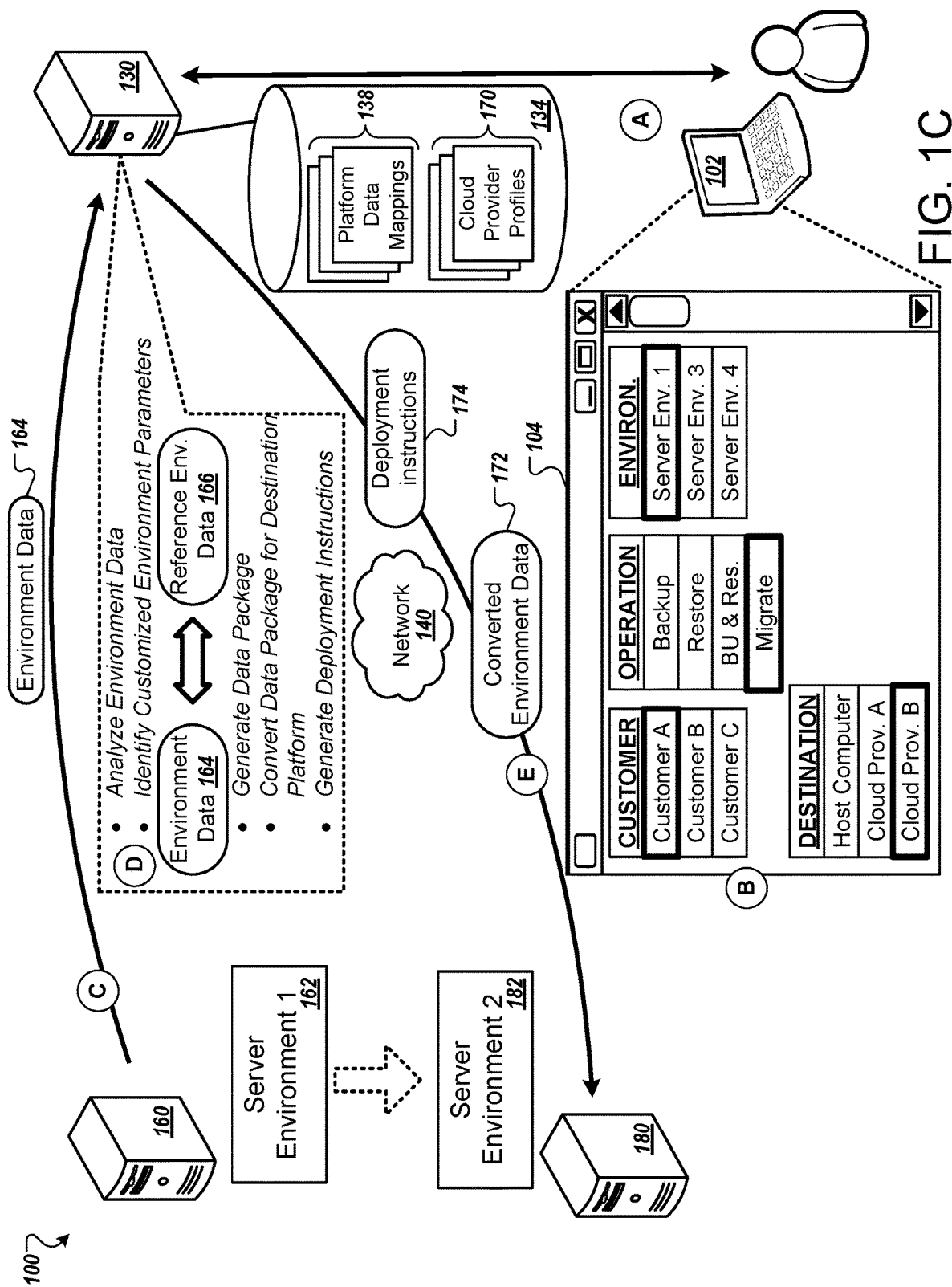
FIG. 1C is a diagram showing an example of migrating a server environment.

FIGS. 1A-1C are diagrams showing an example of a system 100 for backing up, restoring, and migrating a server environment. FIG. 1A shows an example of backing up a server environment. FIG. 1B shows an example of restoring a server environment. FIG. 1C shows an example of migrating a server environment from one cloud computing platform to another.

FIG. 1A also illustrates various events, shown as stages (A) to (E), with each representing a step in an example process for backing up a server environment. Stages (A) to (E) may occur in the illustrated sequence, or in a sequence that is different from the illustrated sequence. For example, some of the stages may occur concurrently.

The system 100 may include an administrator's client device 102, a management system 130, and a network 140. In some implementations, the system 100 also includes a host computer 110 (e.g., FIGS. 1A-1B). In other implementations, the system 100 also includes a first cloud provider 160 and a second cloud provider 180 (e.g., FIG. 1C).

The administrator's client device 102 can be a computing device, such as, for example, a desktop computer or laptop computer. The administrator's client device 102 may communicate with the management system 130 over the network 140.

The host computer 110 can be a computing device, such as, for example, a desktop computer or laptop computer. The host computer 110 can communicate with the management system 130 over the network 140. In some implementations, host computer 110 can be a server. In some implementations, host computer 110 is located on the premises of a customer (i.e., on-premises). In other implementations, the host computer 110 is not located on the premise of a customer (i.e., off-premises). In these implementations, the host computer 110 may be part of a cloud provider (e.g., a third-party server system), such as, for example, Amazon Web Services (AWS). In some implementations, the host computer 110 and the management system 130 are part of single computer system.

The cloud providers 160 and 180 are server systems and can each include one or more computers. The cloud providers 160 and 180 may be provided by a third-party (e.g., AWS, Microsoft Azure, Google Cloud Platform, etc.). The cloud providers 160 and 180 can communicate with the management system 130.

The management system 130 can include one or more computers. The management system 130 can be, include, or be part of a server. The management system 130 includes data storage 134 or otherwise has access to the data storage 134. The management system 130 can communicate with the administrator's client device 102, the host computer 110, and/or the cloud providers 160 and 180. As noted above, in some implementations, the management system 130 and the host computer 110 are part of single computer system.

In general, enterprise applications refer to types of computer software used to fulfill business needs of organizations such as businesses, schools, interest-based user groups, governments, and the like. Often, these applications rely on large databases and serve data to tens, hundreds, or thousands of users in an organization. The enterprise applications can be configured and operated on client devices using a variety types of server environments.

A server environment generally refers to the server portion of a client-server application framework that can be used to exchange application content, data, and/or other information that is necessary to provide and support enterprise applications. In some cases, a server environment can be provided by servers that are owned or managed by the organization that they serve. For example, these may be "on-premises" servers which may be co-located within a particular location associated with an organization. As another example, server environments may be provided by a remote datacenter that a customer operates. As another example, a server environment can be a cloud-based environment provided by servers that are managed and maintained by a third party at a location that may be distant from the organization. In some implementations, as described more particularly below, multiple different server environments can be used within a system to exchange data from a set of distributed data sources.

The techniques disclosed in this document can reduce the time and difficulty in backing up an entire enterprise application system, including the server environment on which the application is running, and restoring the application system to a new platform. The system can reduce the time and difficulty in backing up and later restoring a server environment by converting the server environment data into a universal format that is installation-independent and platform-independent. During backup, the disclosed system may assess the enterprise application, the server system, and the particular server environment on which the application is running in order to make a complete and entire copy of the enterprise application system. During restoration, the disclosed system analyzes the new platform on which the system is to be restored to, and, based on this analysis and the previous assessment, automatically places the data from the backup into correct locations on the new platform so that a new environment is created that matches the original, backed up environment.

The techniques disclosed in this document can also reduce the time and difficulty in migrating an entire enterprise application system, including the server environment on which the application is running, from a first platform to a second platform. The system can reduce the time and difficulty in transferring a server environment by converting the server environment data from a first format associated with the first format to a second format associated with the second platform. During migration, the disclosed system analyzes the server environment data and the new platform on which the system is to be migrated to, and, based on these analyses, converts the server environment data for the new platform. The system can automatically place the converted server environment data into correct locations on the new platform so that a new environment is created that matches the server environment on the first platform.

By taking into account the differences between the original platform and the new platform and adjusting for those differences during the restoration and migration processes, the techniques disclosed can reduce the number of errors that are likely to occur when restoring or migrating a system to a new environment. By automatically analyzing the new platform, placing the application system data into the correct locations on the new platform, and converting the data as need be, the techniques disclosed can also reduce the amount of human input required during backup and restoration of the application system, and, thus, reduce any errors associated with human input.

FIG. 1A depicts an example process for backing up an environment from a platform. As shown in FIG. 1A, in stage (A), the backup process starts with the administrator's client device 102 presenting a user interface 104 to an administrator (e.g., a user of the administrator's client device 102). Through this user interface 104, an administrator may be presented with various operations. These operations may include, for example, a backup operation (in which case an administrator may be presented with a list of server environments and/or applications running on those server environments), a backup and restore operation (in which case an administrator may be presented with a list of server environments, and/or applications running on those server environments, sources and a list of destinations), a restore operation (in which case an administrator may be presented with a list of backed-up server environments and/or backed-up applications, and a list of destinations; see FIG. 1B), and a migrate operation (in which case an administrator may be presented with a list of server environments and/or applications running on those server environments, and a list of destinations; see FIG. 1C). FIG. 1A depicts various events where an administrator has selected a backup operation.

The user interface 104 may present the administrator with an option to select a backup mode. As will be discussed in more detail below, these backup modes may include a manual mode, a semi-automatic mode, an automatic mode, and a cloud mode.

The user interface 104 may present the administrator with a list environments that can be selected by the administrator to be backed up. In some implementations, this list of environments is limited to the server environments belonging to a selected customer. In other implementations, the list of environments contains all environments that are available to be backed up.

In some implementations, the user interface 104 may present the administrator with a list of application running or installed on a particular server environment. For example, when the administrator selects a particular server environment from a list of server environments, the user interface 104 may present the administrator a list of all application running or installed on the selected server environment. The administrator may select one or more applications from the list to backup, restore, backup and restore, or migrate. If the administrator does not select any application, then the entire server environment will be backed-up, restored, backed-up and restored, or migrated.

In some implementations, before presenting a list of operations, the user interface 104 may present the administrator with a list of customers. In these implementations, after an administrator has selected a customer, the user interface 104 may present the administrator with a list of the operations discussed above. In these implementations, after an administrator has selected a customer and a backup operation (or a backup and restore operation), the user interface 104 may present the administrator a list of server environments belonging to a selected customer that are able to be backed up.

In some implementations, the user interface 104 presents the administrator with a list of environments that can be selected by the administrator to be backed up. In some implementations, this list of environments is limited to the server environments belonging to a selected customer. In other implementations, the list of environments is contains all environments that are available to be backed up.

In some implementations, the user interface 104 also presents the administrator with a list of content types (e.g., metadata, cubes, caches, etc.) that can be backed up. This list may be presented to the administrator prior to the presentation of list of environments. When presented to the administrator prior to the list of environments, the selections made to the list of content types might affect which environments are presented in the list of environments (e.g., only the server environments having the content types of the content types selected are presented). Similarly, this list may be presented to the administrator after the presentation of the list of environments. When presented to the administrator after the list of environments, the selections made to the list of environments might affected which content types are presented in the list of content types (e.g., only the content types available for backup for those selected environments are presented).

In some implementations, the user interface 104 also presents the administrator with a list of backup destinations. These available backup destinations may include, for example, a local disk (e.g., as part of the management system 130), an onsite server, or cloud storage (e.g., AWS).

At stage (B), the management system 130 receives input indicating the selection of a backup operation, and input identifying an environment to use for the backup process from the administrator's client device 102. The administrator's client device 102 receives input from the administrator through user interface 104 indicating a selection of the backup operation, and input identifying the environment to be backed up and, in some implementations, the type of content to be backed up and/or the backup destination. Here, the administrator's client device 102 receives input identifying the server environment 120 ("Server Environment A") as the environment to backup. The administrator's client device 102 may also receive a selection of a backup mode (e.g., manual mode, semi-automatic mode, automatic mode, or cloud mode) by the administrator through the user interface 104.

Depending on the backup mode selected, the user interface 104 may present the administrator with one or more fields to input or select information on the environment to be backed up. If a manual mode is selected, the administrator may have to enter or select the enterprise application, the server, and/or the server environment to be backed up. In this mode, the administrator may also have to select a build version of the enterprise application to be backed up. In this mode, the administrator may also have to select specific data objects with the server or the server environment to be backed up. In this mode, the administrator may also have to enter the locations of any data objects that are to be backed up.

If the semi-automatic mode is selected, the administrator's client device 102 may notify the management system 130 of the selection. In this mode, the administrator may have to identify the data objects that are to be backed up, or the location of the data objects that are to be backed up. In this mode, once the management system 130 receives information regarding the data objects to be backed up, the management system 130 may automatically identify the enterprise application associated with those data objects, the server associated with those data objects, and/or the server environment associated with those data objects.

If the automatic mode is selected, the administrator's client device 102 may notify the management system 130 of the selection. In this mode, the management system 130 may proceed to determine the enterprise application, the server, the server environment, and/or the data objects to be backed up based on a presumption of where the data objects reside on the customer's system (e.g., the host computer 110). This presumption may be based on developer knowledge of how a specific customer deploys the enterprise application. This presumption may be based on developer knowledge of how customers generally deploy the enterprise application.

If the manual mode is selected, the administrator's client device 102 may notify the management system 130 of the selection. In this mode, the administrator may have to identify the data objects that are to be backed up, identify the enterprise application or build version of the enterprise application associated with those data objects, identify the server environment associated with those data objects, identify the platform on which that server environment exists, and/or the location of the data objects to be backed up.

If the cloud mode is selected, the administrator's client device 102 may notify the management system 130 of the selection. In this mode, the management system 130 may proceed to determine the enterprise application, the server, the server environment, and/or the data objects to be backed up based on a previous deployment of a server environment. A previous deployment of a server environment may have been through a previous restore of a server environment, and/or a previous migration of a server environment.

In stage (B), once the administrator's client device 102 receives the input from the administrator regarding the backup operations and environment information, the administrator's client device 102 provides this input to the management system 130. The administrator's client device 102 may provide this input to the management system 130 over the network 140.

At stage (C), the management system 130 sends a request for environment data 122 to host computer 110, and receives the environment data 122. The management system 130 may send the request to the host computer 110 over the network 140. The management system 130 may receive the environment data 122 from the host computer 110 over the network 140.

In some implementations, the management system 130 and the host computer 110 are part of a single computer system. In these implementations, the request for environment data 122 does not need to take place over the network 140. In these implementations, the management system 130 does not need to receive the environment data 122 over the network 140.

Prior to sending the request for the environment data 122, the management system 130 may first generate backup instructions based on the received administrator input in stage (B). The instructions generated may depend on the type of backup mode selected by the administrator in stage (B).

Once the management system 130 generates these backup instructions, the management system 130 may send these instructions as a request to host computer 110. Here, these backup instructions indicate that the host computer 110 is to send environment data associated with the server environment 120, e.g., the environment data 122.

In some implementations, the server environment 120 is located on-premises. In other implementations, the server environment 120 is located off-premises, such as on a cloud provider (e.g., AWS, Microsoft Azure, Google Cloud Platform, etc.).

The environment data 122 is data pertaining to the server environment 120 or to a particular application running or installed on the server environment 120. The environment data 122 may include metadata 124, dependencies 126, configuration files 128, etc. In some implementations, dependencies 126 are part of the metadata 124. The metadata 124 is metadata associated with server environment 120. The dependencies 126 are the links existing between data objects found within server environment 120. The configuration files 128 contain the configuration settings or parameters for the server environment 120. In some implementations, the environment data 122 also includes information on the enterprise application being run on the server environment 120, such as, for example, the build version of the enterprise application. In some implementations, the management system 130 receives the environment data 122 as a compressed file (e.g., a Zip file) and proceeds to extract its contents.

In some implementations, the environment data 122 corresponds with a particular application running or installed on the server environment 120. For example, the environment data 122 may only contain a select portion of the metadata, dependencies, and configuration files that area found on the server environment 120. Accordingly, the metadata 124 may represent only a select portion of the metadata of the server environment 120, e.g., the metadata 124 may represent a portion of the metadata that corresponds with the particular application that is being backed up. Similarly, the dependencies 126 may represent only a select portion of the dependencies of the server environment 120, e.g., the dependencies 126 may represent a select portion of the dependencies that corresponds with the particular application that is being backed up. In addition, the configuration files 128 may represent only a select portion of the configuration files of the server environment 120, e.g., the configuration files 128 may represent a select portion of the configuration files that corresponds with the particular application that is being backed up., the dependencies 126, and/or the configuration files 128 of the server environment 120. In these implementations, the environment data 122 may only contain data that corresponds with the particular application that is being backed up, or may only contain data that corresponds with the particular application that is being backed up and only that data which is necessary to later restore or migrate the application. For example, the management system 130 may not need to store the entire application software in the data storage 134 in order to later restore the application or to later migrate the application. Accordingly, the management system 130 may not request the entire application software from the host computer 110.

In determining what data should be included in the environment data 122, the management system 130 may refer to platform data mappings 138. The platform data mapping 138 specify relationships, conversions, and/or differences between various platforms. The platform data mappings 138 may further specify relationships, conversions, and/or differences for a particular application between various platforms. The platform data mappings 138 may further specify relationships, conversions, and/or differences for a particular version of an application between various platforms. The platform data mappings 138 may specify relationships, conversions, and/or differences for between different versions of applications. The platform data mappings 138 may indicate what data from a given platform is needed in order to convert the data during restoration of the specified environment or application, or during migration of the specified environment or application. For example, the platform data mappings 138 may indicate that only a select portion of the metadata, dependencies, and/or the configuration files of the server environment 120 on the host computer 110 should be included in the environment data 122. Accordingly, when the management system 130 request the environment data 122 from the host computer 110, the management system 130 may first refer to the platform data mappings 138 to determine what data and/or what types of data it should request from the host computer 110. In some implementations, the management system 130 uses the platform data mappings 138 to selectively determine what data is should store after it receives the environment data 122 from the host computer 110.

As an example, by referring to the platform data mappings 138, the management system 130 may determine particular portions of data corresponding to an application to save. For example, the management system 130 may selectively save the settings and user data of the application, and the differences between the application and a reference application installation on the data storage 134. However, the management system 130 may choose not to store the OS and the reference application software itself on the data storage 134.

At stage (D), the management system 130 generates a data package 136 for the server environment 120. This data package 136 is based on the environment data 122 received in stage (C). Prior to generating the data package 136, the management system 130 may analyze the environment data 122 and identify any customized environment settings for the server environment 120.

Analyzing the environment data 122 may involve identifying and maintaining dependencies or links between software, such as identifying the dependencies 126 within the environment data 122. Similarly, in some implementations, analyzing the environment data 122 may include organizing the environment data 122 into the categories of the metadata 124, the dependencies 126, and/or the configuration files 128.

In generating the data package 136, the management system 130 may also identify any settings of the server environment 120 that are customized, or specific to the customer's installation (e.g., drive letters, data paths, etc.). The management system 130 may then update those server settings, include a placeholder, or otherwise convert them to the universal format.

In order to determine which, if any, settings of the server environment 120 are customized or specific to the customer's installation, the management system 130 may compare the environment data 122 to reference environment data 132. The reference environment data 132 is environment data that is standard for the type of enterprise application installation that the customer had implemented. The management system 130 may select the reference environment data 132 based on the version of the enterprise application the customer had installed, and/or on the operating system/ platform on which the customer implemented the enterprise application. Customized and/or specific server settings are those settings that differ from the settings found in the reference environment data 132. Identifying any customized or specific settings involves comparing the environment data 122, and/or the configuration files 128 within the environment data 122, with the reference environment data 132.

The management system 130 may use the identified customized or specific environment settings to generate the data package 136. The generated data package 136 is installation-independent and platform-independent. Installation-independent means that the generated data package 136 does not depend on any specific paths, the disk configuration, the processor topology, etc. Platform-independent means that the generated data package 136 includes information in a universal format. That is, the generated data package 136 can be mapped to any of multiple software platforms and hardware configurations, and is not specific to an operating system's file structure (e.g., the Linux file structure), registry settings (e.g., Windows Registry settings), etc. However, there may be file format conversions or other adjustments when the environment is restored. As will be discussed in more detail with reference to FIG. 1B, the data storage 134 includes platform data mappings 138. The platform data mapping 138 may specify the relationships, conversions, difference between platforms, etc. for various platforms. The management system 130 may use the platform data mappings 138 to modify the data package 136 for redeployment on a specific platform during the restoration process.

As mentioned above, the management system 130 may convert the environment data 122 into a standard or universal format through the creation of a data package 136. As will be discussed in more detail below with respect to FIGS. 1B-1C, the management system 130 may later convert the data package 136 back into environment data. The newly generated environment data may be the same as the environment data 122 during a restore operation to the same platform for example. The newly generated environment data may be different than the environment data 122 during a migrate operation. The data package 136 may serve as a backup for the server environment 120 or as a backup for a particular application installed or running on the server environment 120. The data package 136 may consist of data cubes, caches, database dumps, third-party images and plugins, metadata, dependencies, configuration settings for the server environment 120 or for a particular application installed or running on the server environment 120. The management system 130 may automatically convert the environment data 122 into the standard or universal format. The management system 130 may automatically generated the data package 136, for example, during the process of converting the environment data 122 into the standard or universal format.

In some implementations, in generating the data package 136, management system 130 performs a selective backup of known configuration elements as found within environment data 122. These configuration elements may include, for example, configuration files 128, any identified customized server settings, and/or any other settings of server environment 120. In other implementations, in generating data package 136, management system 130 performs a full byte-for-byte disk image of everything on server environment 120.

At stage (E), management system 130 stores the data package 136 (that was generated in stage (D)) in data storage 134. Data storage 134 may also store one or more platform data mappings 138. Data storage 134 is accessible by management system 130. In some implementations, data storage 134 is internal storage. In other implementations, data storage 143 is external storage. In some implementations, data storage 143 is cloud storage.

FIG. 1B depicts an example process for restoring a backed-up server environment to a platform. FIG. 1B illustrates various events, shown as stages (A) to (D), with each representing a step in an example process for restoring a server environment. Stages (A) to (D) may occur in the illustrated sequence, or in a sequence that is different from the illustrated sequence. For example, some of the stages may occur concurrently.

As shown in FIG. 1B, in stage (A), the restore process starts with the administrator's client device 102 presenting a user interface 104 to an administrator (e.g., a user of the administrator's client device 102). Through this user interface 104, an administrator may be presented with various operations. These operations may include, for example, a backup operation (in which case an administrator may be presented with a list of server environments; see FIG. 1A), a backup and restore operation (in which case an administrator may be presented with a list of server environments and a list of destinations), a restore operation (in which case an administrator may be presented with a list of backed-up server environments and a list of destinations), and a migrate operation (in which case an administrator may be presented with a list of server environments and a list of destinations; see FIG. 1C). FIG. 1B depicts a flow of events where an administrator has selected a restore operation.

The user interface 104 may present the administrator with a list of server environments that have been backed up. In some implementations, this list of environments is limited to the server environments backed up for a selected customer. In other implementations, the list of environments contains all environments that have been backed up.

The user interface 104 may present the administrator with a list of available destinations. In some implementations, this list of destinations is limited to the destinations available for a selected customer. In other implementations, the list of destinations contains all available destinations.

In some implementations, before presenting a list of operations, the user interface 104 may present an administrator with a list of customers. In these implementations, after an administrator has selected a customer, the user interface 104 may present the administrator with a list of the operations discussed above. In these implementations, after an administrator has selected a customer and a restore operation (or a backup and restore operation), the user interface 104 may present the administrator a list of server environments that have been backed up for the selected customer and are able to be restored.

At stage B, the management system 130 receives an indication of the selected restore operation, input identifying an environment backup to use for the restore process, and input identifying a destination to use in the restore process from the administrator's client device 102. At this stage, the administrator's client device 102 receives input from the administrator through the user interface 104 indicating a selection of the restore operation, input identifying an environment backup to restore, and input identifying a destination to restore the environment to. Here, the administrator's client device receives input identifying "Environment A" as the environment to restore. Here, the administrator's client device 102 receives input identifying the host computer 110 (i.e., "Customer A's Computer") as the destination.

Once the administrator's client device 102 receives the input from the administrator, the administrator's client device 102 provides this input to the management system 130. The administrator's client device 102 may provide this input to the management system 130 over network 140.

The destination selected by the administrator may be on-premise (e.g., locally connected server) or off-premise (e.g., a cloud provider). The destination selected by the administrator may be one of multiple cloud providers.

In some implementations, restoring an environment includes overwriting or otherwise replacing an old installation of the environment or of a different environment currently existing in the destination. In some implementations, restoring an environment includes creating a completely new environment that can operate in parallel with the original environment or the environment currently existing in the destination.

In some implementations, restoring an environment includes performing an installation on one or more computers in the destination (e.g., host computer 110). In some implementations, restoring an environment includes creating a virtual machine in the destination.

At stage (C), the management system 130 generates environment data 150 and deployment instructions 152. Prior to generating the environment data 150 and the deployment instructions 152, the management system 130 may retrieve one or more characteristics of the destination, the host computer 110. For example, the management system 130 may retrieve information that indicates the destination's operating system, the build version of the enterprise application implemented by the destination, processor type and configuration of the destination, network topology of the destination, storage configuration of the destination, etc. The management system 130 can use these retrieved characteristics to create a platform data mapping of the platform data mappings 138 for the specific destination with respect to a standard or universal format, or may use these characteristics to identify an existing platform data mapping of the platform data mappings for the specific destination.

Where the destination is on-premises, analyzing the destination may include querying the data from a connected system, retrieving it directly from the connected system, or accessing a file with stored destination parameters.

Where the destination is off-premise (e.g., a cloud provider), analyzing the destination may include requesting the data, or accessing stored data specifying the application programing interfaces (APIs), configurations, options, etc. offered by the cloud computing provider.

The management system 130 uses the obtained destination characteristics to create a platform data mapping for the specific destination with respect to a standard or universal format, or may use the obtained destination characteristics to identify an existing platform data mapping of the platform data mappings 138 for the specific destination. The platform data mappings 138 can specify the relationships, conversions, difference between platforms, difference between a platform and a reference platform, differences between platforms with respect to a particular application, differences between platforms with respect to a particular version of an application, differences between different versions of applications, etc. Here, a platform data mapping may be created for the host computer 110, the server environment 120, and/or a particular application installed or running on the server environment 120. The created platform data mapping is stored in the data storage 134.

In some implementations, the platform data mapping for the host computer 110 has already been created by the management system 130 and stored in data storage 134 prior to the start of the restoration process. For example, a platform data mapping may be created for a source/host of a selected environment during the backup process (see FIG. 1A). The created platform data mapping could then be used in the restoration process when a prior source/host of previously selected environment has been identified as the destination.

In generating the environment data 150, the management system 130 may access the data storage 134 and the obtain data package 136 ("Data Package—Environment A"). In some implementations, in generating the environment data 150, the management system 130 may place the data package 136 on top of a standard reference installation image. Using a reference installation image, such as a snapshot of the build version of the enterprise application implemented in the destination or a clone of the destination, can reduce the time needed to perform the restoration process, as there would be no need to spend time on running an installer. In these implementations, there may be more than one reference installation image and the reference installation image selected may be based on the obtained characteristics of the destination (e.g., operating system of the destination, enterprise application build version implemented by destination, etc.). In some implementations, in generating the environment data 150, the management system 130 may select a particular installer to successfully deploy the data package 136 on the destination. The installer selected may be based on the obtained characteristics of the destination (e.g., operating system of the destination, enterprise application build version implemented by destination, etc.).

In converting the data package 136 into the environment data 150, the management system 130 may identify and maintain dependencies or links between software through the conversion process. For example, the management system 130 may identify dependencies existing within the data package 136, and ensure that those dependencies remain intact in the environment data 150.

Using the platform data mapping for the destination, the host computer 110, within the platform data mappings 138, the management system 130 converts the data package 136, having a standard or universal format, to the environment data 150, having a specific format for deployment on the destination platform. In converting the data, the management system 130 must identify all the dependencies, links to data sources, and other data relationships within the data package 136 and modify those relationships for the specific hardware and software configuration of the destination.

The management system 130 generates the deployment instructions 152. Using the platform data mappings for the destination from the platform data mappings 138 and the generated environment data 150, the management system 130 creates a script (e.g., SQL script) for loading the environment data 150 onto the destination. The script serves as the deployment instructions 152 and contains any changes, instructions, and/or updates that are to be run on the new environment, the server environment 154, in the destination.

At stage (D), the management system 130 sends the environment data 150 along with the deployment instructions 152 to the destination. Sending the environment data 150 along with the deployment instructions 152 to the destination causes the destination machine to be configured (or re-configured) with the restored server environment 154. The restored server environment 154 may have environment data that is identical to the environment data 122 of the server environment 120 as shown in FIG. 1A. That is, the environment data of the restored server environment 154 may contain the metadata 124, the dependencies 126, the configuration files 128, etc.

FIG. 1C depicts an example process for migrating an environment from a first platform to a second platform. FIG. 1C illustrates various events, shown as stages (A) to (E), with each representing a step in an example process for migrating a server environment. Stages (A) to (E) may occur in the illustrated sequence, or in a sequence that is different from the illustrated sequence. For example, some of the stages may occur concurrently.

As shown in FIG. 1C, in stage (A), the migration process starts with the administrator's client device 102 presenting a user interface 104 to an administrator (i.e., a user of the administrator's client device 102). Through this user interface 104, an administrator may be presented with various operations. These operations may include, for example, a backup operation (in which case an administrator may be presented with a list of server environments; see FIG. 1A), a backup and restore operation (in which case an administrator may be presented with a list of server environments and a list of destinations), a restore operation (in which case an administrator may be presented with a list backed-up server environments and a list of destinations; see FIG. 1B), and a migrate operation (in which case an administrator may be presented with a list server environments and a list of destinations). The example of FIG. 1C depicts processing where an administrator has selected a migrate operation.

The user interface 104 may present the administrator with a list of server environments that are available for migration. In some implementations, this list of environments is limited to the server environments belonging to a selected customer. In other implementations, the list of environments contains all environments that are available for migration.

In some implementations, before presenting a list of operations, the user interface 104 may present an administrator with a list of customers. In these implementations, after an administrator has selected a customer, the user interface 104 may present the administrator with a list of the operations discussed above. In these implementations, after an administrator has selected a customer and a migrate operation, the user interface 104 may present the administrator a list of server environments belonging to the selected customer and are available for migration.

At stage (B), the management system 130 receives an indication of the selected migration operation, input identifying an environment to migrate, and input identifying a destination to use in the migration process from the administrator's client device 102. The administrator's client device 102 receives input from the administrator through the user interface 104 indicating a selection of the migrate operation, input identifying an environment to migrate, and input identifying a destination to migrate the environment to. Here, the administrator's client device receives input identifying "Server Environment 1" as the environment to migrate. Here, the administrator's client device 102 receives input identifying cloud provider 180 (i.e., "Cloud Provider B") as the destination.

Once the administrator's client device 102 receives the input from the administrator, the administrator's client device 102 provides this input to management system 130. The administrator's client device 102 may provide this input to the management system 130 over the network 140.

The destination selected by the administrator may be on-premise (e.g., locally connected server) or off-premise (e.g., a cloud provider). The destination selected by the administrator may be one of multiple cloud providers.

In some implementations, migrating an environment includes overwriting or otherwise replacing an environment currently existing in the destination. In some implementations, migrating an environment includes creating a completely new environment that can operate in parallel with the environment currently existing in the destination.

In some implementations, migrating an environment includes performing an installation on one or more computers in the destination. In some implementations, migrating an environment includes creating a virtual machine in the destination.

At stage (C), the management system 130 sends a request for environment data 164 to the cloud provider 160 and receives the environment data 164. The management system 130 may send the request over network 140. The management system 130 may receive the environment data 164 from the cloud provider 160 over network 140.

In implementations where a locally connected server is selected as the destination (e.g., host computer 110 as shown in FIG. 1B), management system 130 and the locally connected server may be part of a single computer system. In these implementations, the request for environment data 164 does not need to take place over the network 140. In these implementations, the management system 130 does not need to receive the environment data 122 over the network 140.

As shown, the requested environment, the server environment 162, is located off-premises, on the cloud provider 160. In other implementations, the requested environment may be located on-premises.

The environment data 164 is data pertaining to the requested environment, the server environment 162. The environment data 164 may include metadata, dependencies, configuration files, etc. In some implementations, the environment data 164 also includes information on the enterprise application being run on the server environment 162, such as, for example, the build version of the enterprise application. In some implementations, the management system 130 receives the environment data 164 as a compressed file (e.g., a Zip file) and proceeds to extract its contents.

At stage (D), the management system 130 analyzes the environment data 164 and converts it to environment data 172. Analyzing the environment data 164 involves the management system 130 identifying any customized environment settings for server environment 162. Converting the environment data 164 into the environment data 172 involves either the management system 130 converting the environment data 164 into a standard or universal format through the creation of a data package and then converting the data package into environment data 172, or converting the environment data 164 directly into the environment data 172. Converting the environment data 164 into environment data 172 further involves the management system 130 analyzing the destination.

Analyzing the environment data 164 may involve the management system 130 identifying and maintaining dependencies or links between software, such as identifying dependencies existing within the environment data 164. Similarly, in some implementations, analyzing environment data 164 may include the management system 130 organizing the environment data 164 into the categories of metadata, dependencies, and/or configuration files.

When analyzing the environment data 164, the management system 130 may identify any settings of the server environment 162 that are customized, or specific to the customer's installation (e.g., drive letters, data paths, etc.). The management system 130 may then update those server settings, include a placeholder, or otherwise convert them to the standard or universal format, or the destination's format.

In order to determine which if any settings of the server environment 162 are customized or specific to the customer's installation, the management system 130 may compare the environment data 164 to reference environment data 166. The reference environment data 166 is environment data that is standard for the type of enterprise application installation that the customer had implemented. The management system 130 may select the reference environment data 166 based on the version of the enterprise application the customer had installed, and/or on the operating system/ platform on which the customer implemented the enterprise application. Customized and/or specific server settings are those settings that differ from the settings found in the reference environment data 166. Identifying any customized or specific settings involves comparing the environment data 164 with the reference environment data 166.

In some implementations, where an application is being migrated, the management system 130 may compare the environment data 164 to a reference application installation.

The management system 130 can use the identified customized or specific settings in converting the environment data 164 to the environment data 172. In some implementations, the management system 130 uses the identified customized or specific settings to generate a data package that is subsequently stored in data storage 134. The data package may be generated in a manner similar to that described above with respect to FIG. 1A. In other implementations, the management system 130 uses the identified customized or specific settings in converting the environment data 164 directly to the environment data 172.

The management system 130 analyzes the destination (here, cloud provider 180) in order to determine installation-specific and platform-specific characteristics of the destination. In making this determination, the management system 130 may create/lookup a platform data mapping for the destination of the platform data mappings 138, compare the destination to a reference installation image, and/or lookup a cloud provider profile of the destination of the cloud provider profiles 170. The management system 130 uses the determined installation-specific and platform-specific characteristics of the destination to generate the environment data 172.

When determining installation-specific and platform-specific characteristics of the destination, the management system 130 may retrieve one or more characteristics of the destination. For example, the management system 130 may retrieve information that indicates the destination's operating system, the build version of the enterprise application implemented by the destination, processor type and configuration of the destination, network topology of the destination, storage configuration of the destination, etc. The management system 130 can use these retrieved characteristics to create a platform data mapping of the platform data mappings 138 for the specific destination with respect to a standard or universal format, or may use these characteristics to identify an existing platform data mapping of the platform data mappings for the specific destination. Here, a platform data mapping is created for the cloud provider 180 with respect to a standard or universal format. The created platform data mapping may be stored in the data storage 134.

In some implementations, the platform data mapping of the cloud provider 180 with respect to a standard or universal format has already been created by the management system 130 and stored in the data storage 134 prior to the start of the migration process.

To determine installation-specific and platform-specific characteristics of the destination, the management system 130 may also compare the destination with a reference installation image. There may be more than one reference installation image and the reference installation image selected may be based on the obtained characteristics of the destination (e.g., operating system of the destination, enterprise application build version implemented by destination, etc.).

To determine determining installation-specific and platform-specific characteristics of the destination, the management system 130 may also lookup a cloud provider profile for the destination of the cloud provider profiles 170. A cloud provider profile may specify the APIs, the limitations, the configuration settings, and the options for each cloud provider.

Using the platform data mapping for the destination (i.e., for cloud provider 180) of the platform data mappings 138, the results of the comparison between the destination and a reference installation image, and/or the cloud provider profile for the destination, the management system 130 generates the environment data 172. In generating the environment data 172, the management system 130 converts the environment data 164, having a specific format for the cloud provider 160, or the created data package, having a universal format, to the environment data 172, having a specific format for deployment on the destination platform. In converting the data, the management system 130 must identify all the dependencies, links to data sources, and other data relationships within the environment data 164 or the created data package and modify those relationships for the specific hardware and software configuration of the destination.

The management system 130 generates deployment instructions 174. Using the platform data mappings for the destination from the platform data mappings 138, the cloud provider profile for the destination from the cloud provider profiles 170, and the generated the environment data 172, the management system 130 creates a script (e.g., SQL script) for loading the environment data 172 onto the destination. The script serves as the deployment instructions 174 and contains any changes, instructions, and/or updates that are to be run on the new environment (e.g., the server environment 182) in the destination.

At stage (E), the management system 130 sends the environment data 172 along with the deployment instructions 174 to the destination. Sending the environment data 172 along with the deployment instructions 174 to the destination causes the destination machine to be configured (or re-configured) with the new server environment 182.

Figure 2:
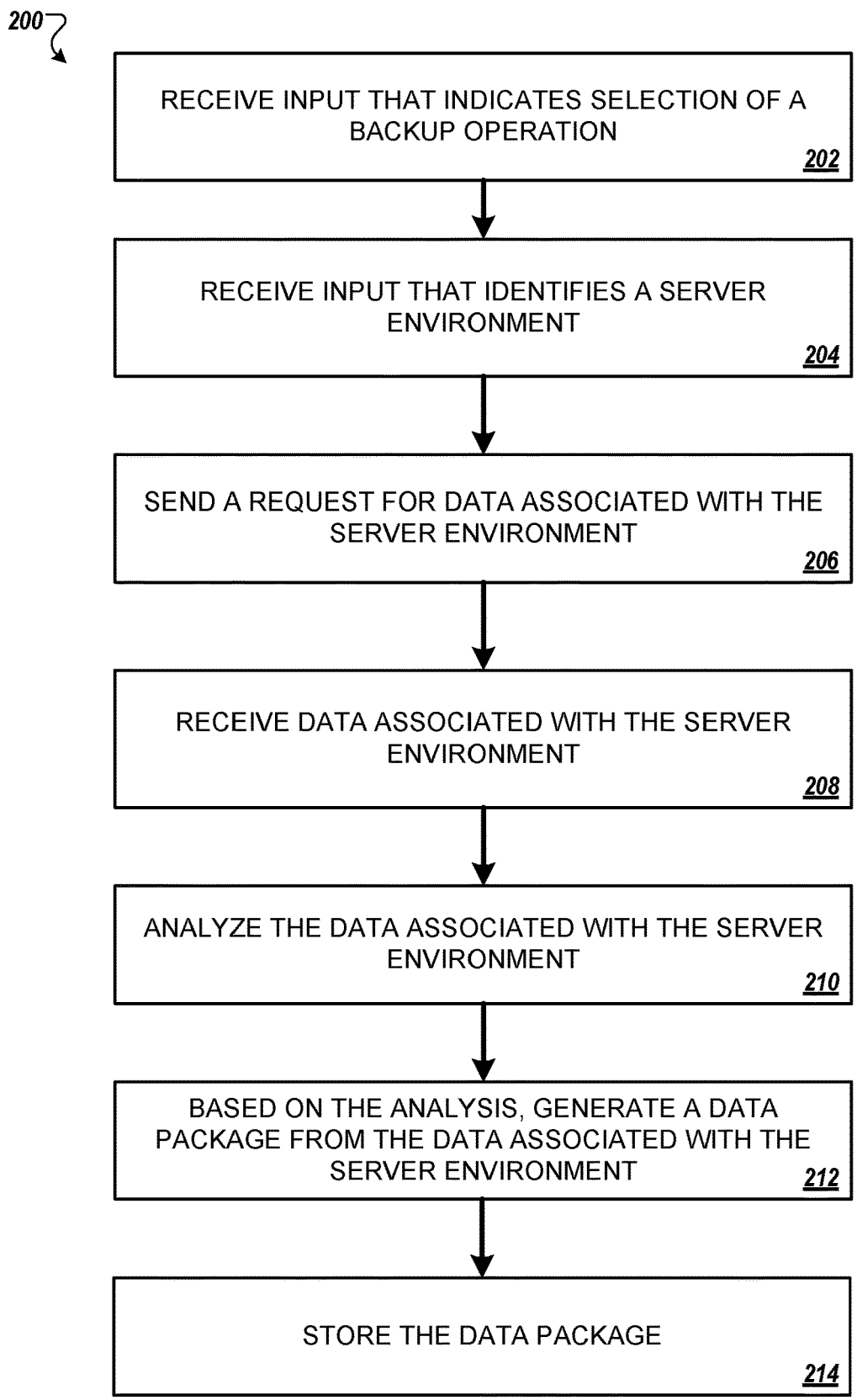
FIG. 2 is a flow diagram illustrating an example of a process for backing up a server environment.

FIG. 2 is an example process 200 for backing up a server environment. The process 200 can be performed, at least in part, using the system 100 described herein.

In the process 200, a computer system receives input that indicates selection of a backup operation (step 202). A user, such as an administrator, may select the backup operation from a list of operations. A user may make the selection through a user interface.

The computer system receives input that identifies a server environment (step 204). The identified server environment is the server environment that is to be backed up. A server environment may exist on a variety of platforms, such as, for example, an on-premises computer system or a cloud provider. A user may identify the server environment through the user interface. A user may select the server environment from a list of server environments that are available to be backed up. A user may enter a server environment to back up.

The computer system sends a request for data associated with the server environment (step 206). This request may be sent to the platform on which the server environment exists. This request may be sent over a network. In some implementations, the platform on which the server environment exists is the computer system itself. The request for data may be a request for server environment data. Server environment data may include configuration information, dependencies, metadata description, and other information associated with the identified server environment.

The computer system receives data associated with the server environment (step 208). The received data may be server environment data.

The computer system analyzes the data associated with the server environment (step 210). Analyzing the data may include comparing the received data with reference data in order to determine customized or unique settings of the identified server environment.

Based on the analysis, the computer system generates a data package from the data associated with the server environment (step 212). Generating a data package may include converting the data associated with the server environment from a first format to a universal format. A universal format is installation-independent and platform-independent.

The computer system stores the generated data package (step 214). By storing the generated data package, the computer system has successfully backed up the identified server environment.

Figure 3:
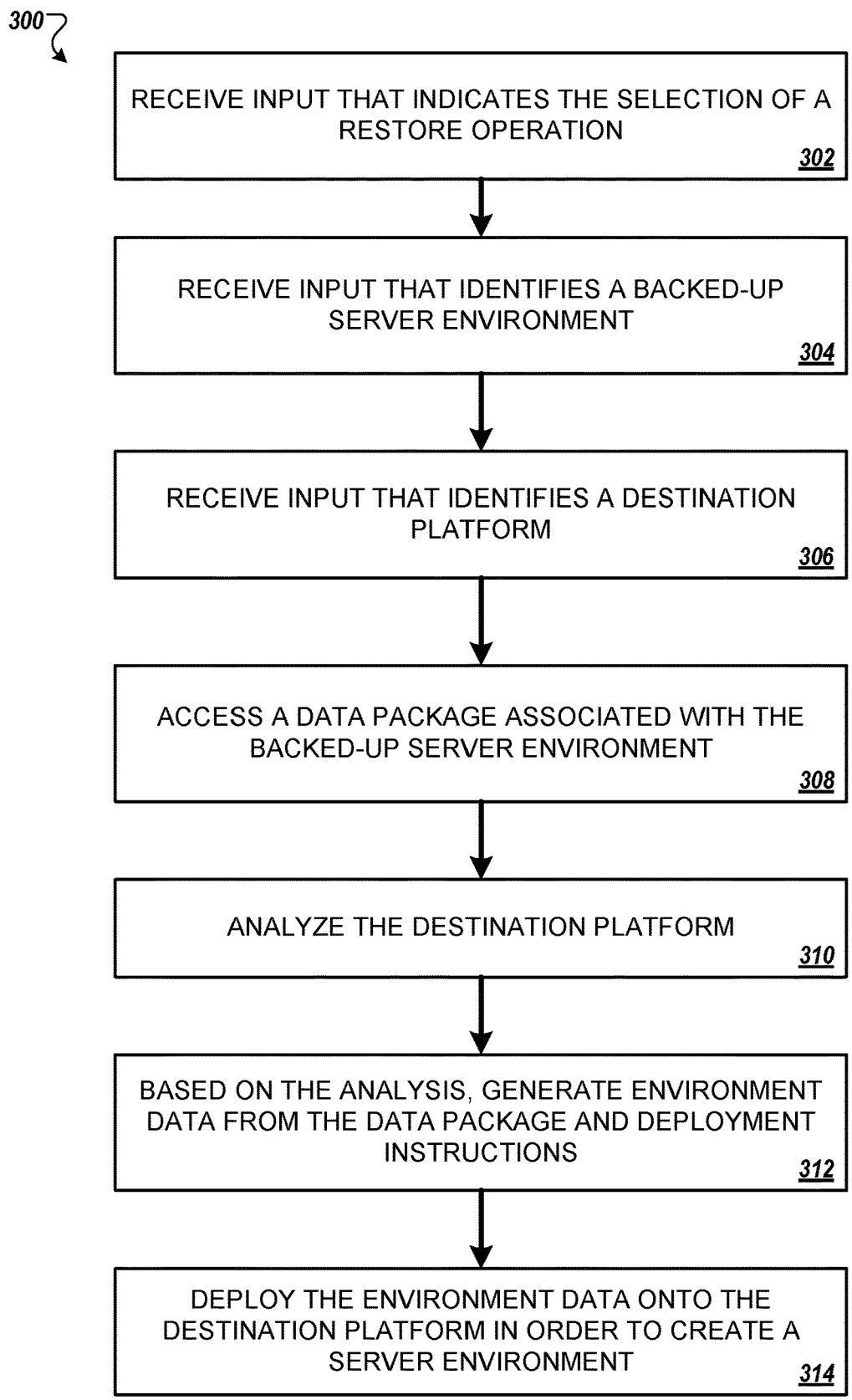
FIG. 3 is flow diagram illustrating an example of a process for restoring a server environment.

FIG. 3 is an example process 300 for restoring a server environment from a stored data package. The process 300 can be performed, at least in part, using the system 100 described herein.

In the process 300, a computer system receives input that indicates selection of a restore operation (step 302). A user, such as an administrator, may select the restore operation from a list of operations. A user may make the selection through a user interface.

The computer system receives input that identifies a backed-up server environment (step 304). The identified backed-up server environment is the server environment that is to be restored. A user may identify the backed-up server environment through the user interface. A user may select the backed-up server environment from a list of backed-up server environments.

The computer system receives input that identifies a destination platform (step 306). A user may identify the destination platform through the user interface. A user may select the destination platform from a list of available platforms. A user may enter a destination platform through the user interface.

The computer system accesses a data package associated with the backed-up server environment (step 308). The data package is in a universal format.

The computer system analyzes the destination platform (step 310). Analyzing the destination platform may include identifying characteristics of the destination platform. Characteristics can include an operating system of the destination platform, a build version of an enterprise application implemented on the destination platform, a processor type used by the destination platform, a processor configuration of the destination platform, a network topology of the destination platform, a storage configuration of the destination platform, or an application programming interface of the destination platform. Analyzing the destination platform can include identifying a reference installation image comparing the destination platform to the reference installation image.

Based on the analysis, the computer system generates environment data from the data package and deployment instructions (step 312). Generating environment data from the data package can include converting the data package from a universal format to a format specific to the destination platform. Deployment instructions dictate how to deploy the environment data onto the destination platform. Deployment instructions may specify how to set up a new environment, to load data, to run installers, to change settings, to apply converted dependencies, etc.

The computer system deploys the environment data onto the destination platform in order to create a server environment (step 314). In deploying the converted environment data onto the destination platform, a new server environment is created.

Figure 4:
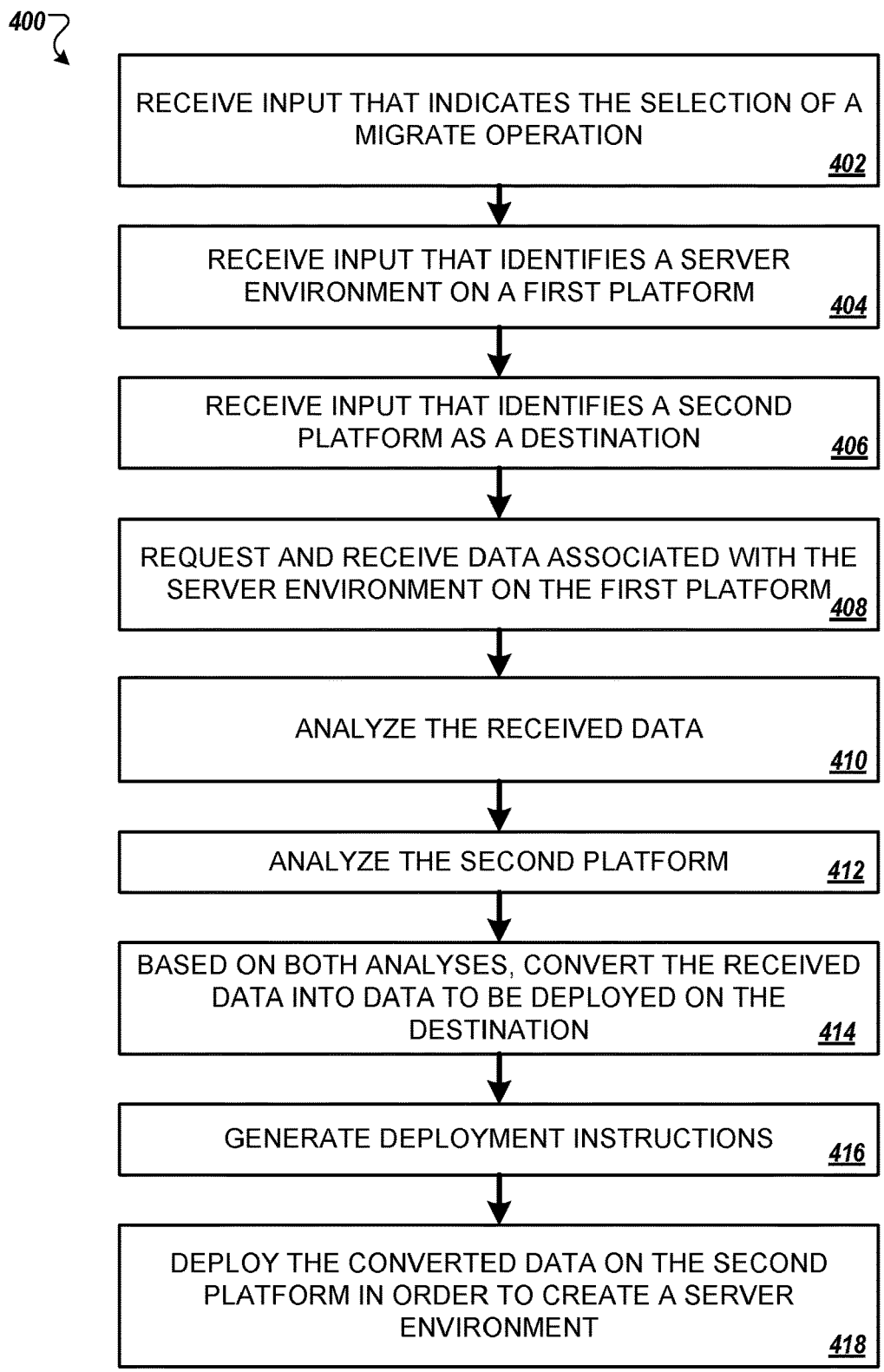
FIG. 4 is flow diagram illustrating an example of a process for migrating a server environment.

FIG. 4 is an example process 400 for migrating a server environment from a first platform to a second platform. The process 400 can be performed, at least in part, using the system 100 described herein.

In the process 400, a computer system receives input that indicates selection of a migrate operation (step 402). A user, such as an administrator, may select the migrate operation from a list of operations. A user may make the selection through a user interface.

The computer system receives input that identifies a server environment on a first platform (step 404). A user may identify the server environment through the user interface. A user may select the server environment from a list of available server environments.

The computer system receives input that identifies a second platform as a destination (step 406). A user may identify the second platform through the user interface. A user may select the second platform from a list of available platforms. A user may enter a second platform through the user interface.

The computer system requests and receives data associated with the server environment on the first platform (step 408). This request may be sent to the first platform on which the server environment exists. This request may be sent over a network. In some implementations, the first platform on which the server environment exists is the computer system itself. The request for data may be a request for server environment data. Server environment data may include configuration information, dependencies, metadata description, and other information associated with the identified server environment. The received data may be server environment data.

The computer system analyzes the received data (step 410). Analyzing the data may include comparing the received data with reference data in order to determine customized or unique settings of the identified server environment.

The computer system analyzes the second platform (step 412). Analyzing the second platform may include identifying characteristics of the second platform. Characteristics can include an operating system of the second platform, a build version of an enterprise application implemented on the second platform, a processor type used by the second platform, a processor configuration of the second platform, a network topology of the second platform, a storage configuration of the second platform, or an application programming interface of the second platform. Analyzing the second platform can include identifying a reference installation image comparing the second platform to the reference installation image.

Based on both analyses, convert the received data into data to be deployed on the destination (step 414). Converting the received data may include converting the received data from a first format specific to the first platform to a second format specific to the second platform. In some implementations, prior to converting the data into the second format, the computer system converts the data into a universal format.

The computer system generates deployment instructions (step 416). Deployment instructions dictate how to deploy the environment data onto the second platform. Deployment instructions may specify how to set up a new environment, to load data, to run installers, to change settings, to apply converted dependencies, etc.

The computer system deploys the converted data on the second platform in order to create a server environment (step 418). In deploying the converted environment data onto the destination platform, a new server environment is created.

Figure 5A:
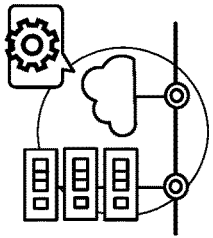
Figure 5C:
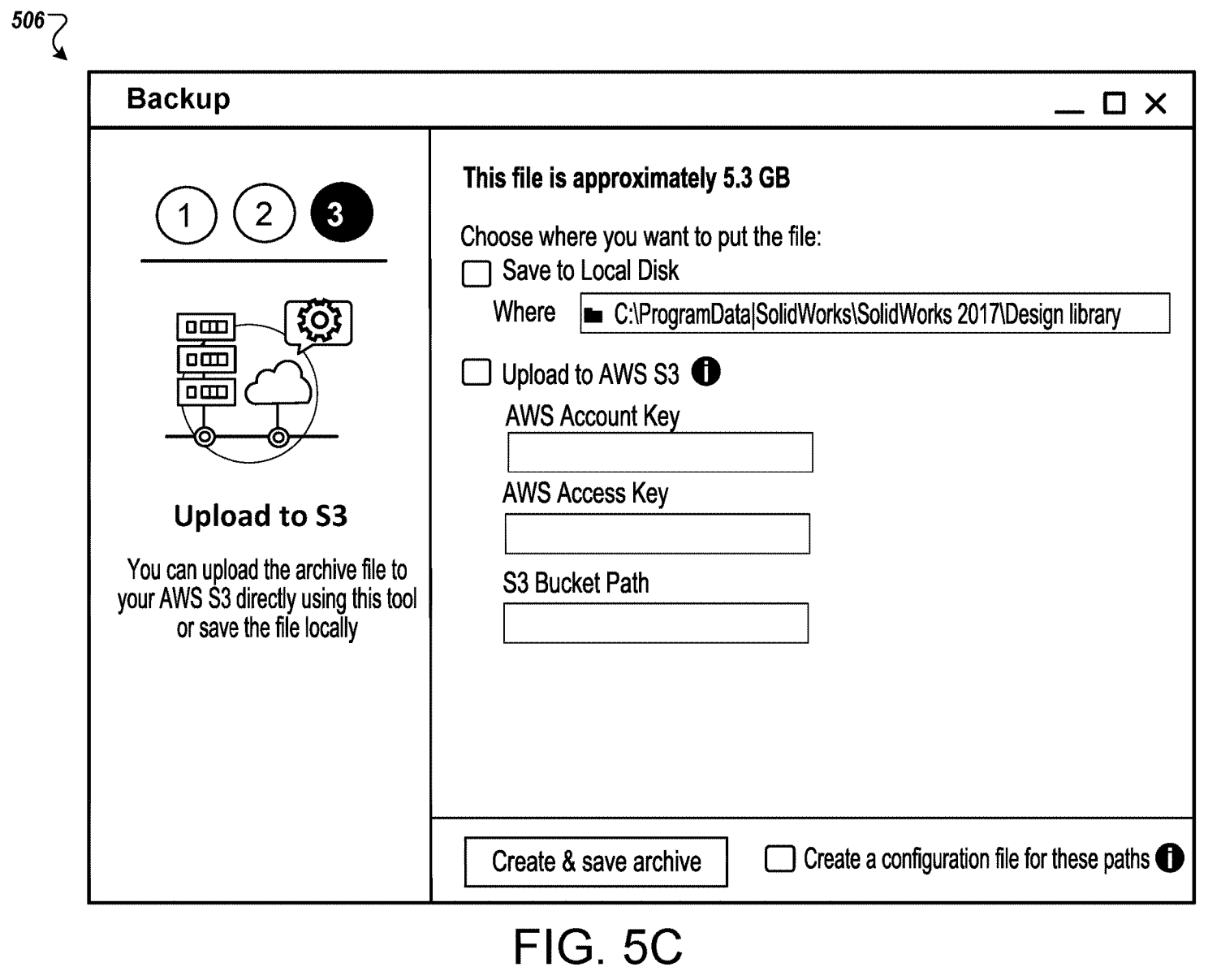

FIGS. 5A-5C are diagrams illustrating example interfaces 502, 504, 506 for the disclosed system (e.g., the system 100 as shown in FIGS. 1A-1C) during a backup operation. The interfaces 502, 504, 506 may be graphical user interfaces (GUIs) that are displayed on a screen (e.g., a touchscreen) of a device (e.g., administrator's client device 102 as shown in FIGS. 1A-1C). For example, FIGS. 5A-5C represent interfaces that can be shown to a user to select content to specify how to back up content, as discussed above with respect to stage (A) of FIG. 1A.

FIG. 5A is a diagram illustrating an example interface 502 for selecting the content to be backed up. Here, an administrator has selected to back up "All" the content types which automatically selects the other content types (e.g., metadata, cubes, caches, etc.). If an administrator chooses the "Back" button 510A they may be brought to an interface in which they could reselect the backup operation, select a backup and restore operation, or select a migrate operation. When an administrator is finished choosing the content types to be backed up, they select the "Next" button 512A which initiates the system locating the content to chosen to be backed up. This selection may present the administrator the interface 504 as shown in FIG. 5B.

FIG. 5B is a diagram illustrating an example interface 504 for locating and verifying content to be backed up. Here, the system has located the content to be backed up and/or is in the process of locating the content. As shown, the system has finished searching for metadata content types and has found a metadata database "10.8 Dev Metadata." This database requires the administrator to enter a username and password in order for the administrator to verify the database for backup. In some implementations, where the system is unable to automatically locate the database/content to be backed up, an administrator can manually enter the required information (e.g., name of the database, location, etc.). If the administrator selects the "Back" button 510B, the administrator may be brought back to the interface 502 as shown in FIG. 5A to reselect content types to backup. When the administrator selects the "Next" button 512B after having entered a username and password to verify the database (or selected other content that does not require a username and password), the administrator may be presented the interface 506 as shown in FIG. 5C.

FIG. 5C is a diagram illustrating an example interface 506 for selecting a backup destination. As shown, the administrator can choose to save this backup locally (e.g., on the management system 130 as shown in FIGS. 1A-1C) or can choose to upload it to cloud storage (here, to AWS in the form of an AWS S3 bucket). The administrator may be presented a file size of the backup (here, the file size is 5.3 GB). The administrator can optionally select to create a configuration file for the data paths of this backup. When the user selects the "Create & Save" button 514, the system creates the backup and stores it in accordance with the administrator's selections in the interface 506.

Figure 6:
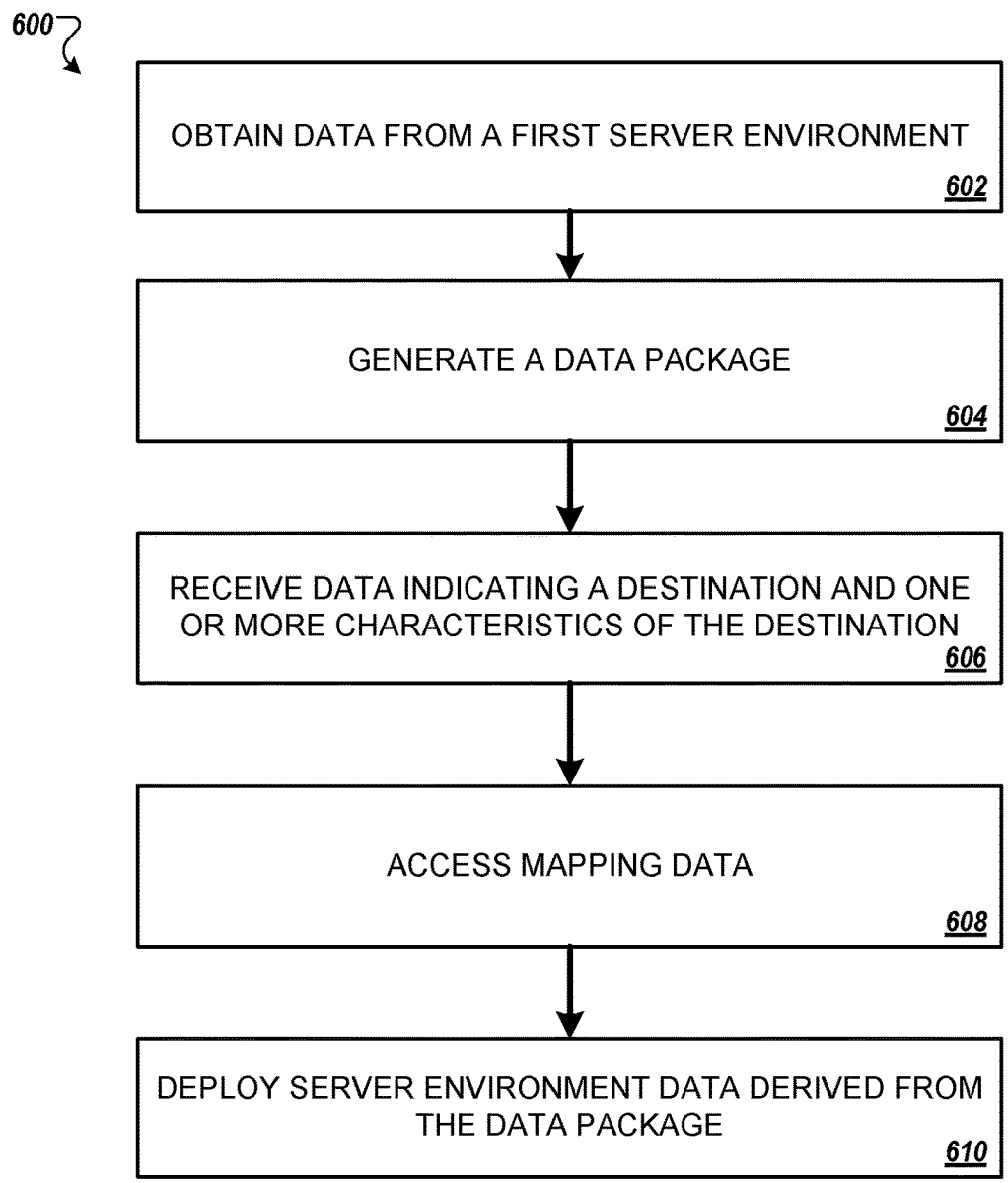
FIG. 6 is a flow diagram illustrating an example of a process for migrating a server environment.

FIG. 6 is a flow diagram illustrating an example of a process 600 for migrating a server environment. The process 600 can be performed by one or more computers, for example, a management system 130 as discussed above.

The process 600 includes obtaining data from a first server environment (602). For example, with respect to FIG. 1C, the management system 130 may obtain environment data 164 from the first cloud provider 160. The data may include, for example, configuration data of the first server environment, data objects used by the first server environment, and at least some metadata corresponding to one or more of the data objects. Examples of data objects include OLAP data cubes, caches, database dumps, software images, and plugins. Many other types of data objects can be obtained.

The process 600 includes generating a data package (604). For example, with respect to FIG. 1C, the management system 130 generate a data package from the obtained environment data 164. In generating the data package, the management system 130 may compare the environment data 164 with the reference environment data 166. In generating the data package, the management system 130 may refer to a platform data mapping in the platform data mappings 138 corresponding to the first cloud provider 160 and/or a cloud provider profile in the cloud provider profiles 170 corresponding to the first cloud provider 160. Generating data package can include rearranging the data from the first server environment to conform to the predetermined arrangement with which data is stored in the data package.

In some implementations, the process of generating the data package includes identifying non-standard characteristics of the first server environment by comparing the data from the first server environment with reference data representing a reference configuration of a server environment. Generating the data package can also include comparing settings of the server system to a set of reference settings and storing, in the data package, settings identified as different from the corresponding settings in the set of reference settings. For example, the data package can the store data indicating an identifier for the reference configuration and the differences between the first server environment and the reference configuration, rather than storing the entire set of data from the first server environment. This can provide significant space savings, especially when storing data packages for many systems and for systems that have many parameters that use the default or reference values for the parameters in the reference configuration. As part of this process, the analysis can be done at the level of the entire environment, or on a more fine-grained level of individual applications, services, containers, or other components. For example, generating the data package can include generating and storing a ledger of elements of an application of the first server environment that are different from a reference configuration of the application.

The process 600 includes receiving data indicating a destination and one or more characteristics of the destination (606). For example, as discussed with respect to FIG. 1C, the management system 130 may receive, obtain, or lookup one or more characteristics of the second cloud provider 180 which provides a destination. In looking up one or more characteristics of the second cloud provider 180, the management server 130 may identify a cloud provider profile among the cloud provider profiles 170 corresponding to the second cloud provider 180, and may retrieve one or more characteristics of the second cloud provider from the cloud provider profile. The one or more characteristics may represent characteristics of a specific software environment (e.g., software installation or virtual machine) to which configuration information is to be deployed.

The system may use the characteristics of the destination to determine how to deploy the information in the data package, for example, how values of settings should be expressed, where files should be stored, what the files should be named, which information to include or omit in the deployment, and so on. As discussed further below, characteristics of the destination can be used to select which set of mapping data will be used to convert information from the data package into the deployed format. A few examples of characteristics of the destination that may be determined include a type or version an operating system of the destination, a build version of an enterprise application at the destination, a processor type for the destination, a processor configuration for the destination, a network topology of the destination, a storage configuration of the destination, and an application programming interface used by the destination.

The destination may have one or more characteristics that are different from those of the first server environment or a server platform on which the first server environment is provided. For example, compared to the server for the first server environment, the destination may have a different hardware configuration, a different network topology, a different server type, a different operating system, and/or a different software version of software installed.

The process 600 includes accessing mapping data (608). For example, with respect to FIG. 1C, the management system 130 may access a platform data mapping in the platform data mappings 138 corresponding to the second cloud provider 180.

The system can have multiple sets of mapping data, which can be used to translate or convert settings from different computer configurations to the predetermined arrangement of the data package. As an example, the system can obtain data indicating one or more characteristics of the first server environment. The system can then select, from among multiple sets of mapping data, a set of mapping data that maps elements of the first server environment to the predetermined arrangement (e.g., a certain standardized format, structured representation, standardized ranges of values, etc.). To generate the data package, the selected set of mapping data can be used to convert the data from the first server environment to a standardized form in the data package. In some implementations, the multiple sets of mapping data each correspond to a different software version. The sets of mapping data can respectively indicate a correspondence of data for the corresponding software versions to a same standardized arrangement of data. As additional examples, sets of mapping data can correspond to different hardware platforms, different network topologies, different applications or services, and/or to different combinations of these factors.

Mapping data can also be used to translate or convert information from the data package into a form used by the destination. For example, to obtain data to deploy, the system can obtain data indicating a second software version for deploying a server environment from the data package. The second software version may be different from a software version used in the first server environment, such that different formats or content of configuration data is used between the source and destination environments. Of course, the software versions may be the same in some instances also, such as restoring a backup to the same environment from which it was derived. The system may select, from among the multiple sets of mapping data, a set of mapping data indicating a correspondence of data in the standardized arrangement of data of the data package to data used by software of the second software version. The sets of mapping data used to deploy information from the data package may be the same as or different from the sets of mapping data used to package data into the data package.

In some implementations, a set of conversion rules can be used to ensure that compatibility is achieved when data is deployed. Each set of mapping data can have a different set of conversion rules, to ensure that the corresponding destination platform's requirements are met. For example, each set of conversion rules can check that settings are set to within valid ranges of values, that no important settings are left undefined, that configuration data does not conflict, and so on. The conversion rules may include default settings or other configuration information that the conversion rules can use when values or data are missing or invalid for the destination computing environment.

The process 600 includes deploying server environment data derived from the data package (610). For example, with respect to FIG. 1C, the management system 130 may use a platform data mapping in the platform data mappings 138 corresponding to the second cloud provider 180 to convert the data package from a standard or universal format to a format for the second cloud provider 180, thereby generating the converted environment data 172. The management system 130 may send the converted environment data 172 to the second cloud provider along with deployment instructions 174.

The first server environment may include multiple applications and/or services, and the server environment data deployed to and stored at the destination may be configured to replicate a configuration of one or more of the applications and/or services from the first server environment at the destination. In some cases, the deployed data replicates the configuration of each of the multiple applications and/or services.

The first server environment can be provided by a first server system, and the destination can be a second server system that has one or more characteristics that are different from the first server system that provides the first server environment. Of course, one or both of the first server environment and the destination server environment may be virtual machines, container-based implementations, or other environments which may be run on hardware of a remote, shared, distributed, and/or cloud-based platform.

The process of generating the data package and deploying the server environment data derived from the data package can translate the configuration data from a form used in the first server environment to a different form used by the second server environment. As discussed above, this translation process may involve first mapping, translating, or otherwise converting the configuration data from a form used by the first server environment to the data package as an intermediate form of configuration data, and from the form used by the data package to a final form used in the deployment at the second server environment.

Many different arrangements are possible for the source and destination environments. As an example, the first server environment can be provided by an on-premises server system and the destination server environment can be provided by a cloud computing platform. As another example, the first server environment can be provided by a cloud computing platform and the destination server environment can be provided by a cloud computing platform. As another example, the first server environment can be provided by a cloud computing platform and the destination server environment can be provided by an on-premises server system. As another example, the first server environment can be provided by an on-premises server system and the destination server environment can be provided by an on-premises server system.

In some implementations, the data from the first server environment includes data for a specific application of the first server environment. The data package can include data for the specific application, arranged in the predetermined arrangement. Indeed, the arrangement may be specific to the application or application type as well. Deploying the server environment data can include deploying data for the specific application to substantially replicate, at the destination, a configuration of the specific application at the first server environment.

I some implementations, the specific application is a first version of the specific application. The system can receive an indication of a second version of the specific application to be used in a server environment at the destination. The second version can be different from the first version, and the second version can provide a different set of functionality compared to the first version. Deploying the server environment data can include converting settings indicated by the data package to a set of settings for the second version of the specific application. This may require interpolating, replacing, or otherwise changing some settings to achieve compatibility. These changes or updates, along with the addition of potential default settings for new functionality that was not in the first version, can be provided in a set of the mapping data for carrying out the data conversion.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:

obtaining, by one or more computers, data from a first server environment, the data comprising configuration data indicating a configuration of the first server environment, data objects used by the first server environment, and at least some metadata corresponding to one or more of the data objects;

identifying, by the one or more computers, dependencies among software of the first server environment;

generating, by one or more computers, a data package for the first server environment by selectively including data from the first server environment in the data package while excluding at least some software of the first server environment from the data package, wherein the data package specifies the identified dependencies among software of the first server environment and includes the configuration data, the data objects, and the at least some metadata, wherein generating the data package comprises converting the data from the first server environment to a predetermined data format;

receiving, by one or more computers, data indicating (i) a destination on which to deploy the data from the first server environment in the generated data package and (ii) one or more characteristics of the destination;

accessing, by one or more computers, mapping data that specifies how to convert between (i) locations and formats for a set of elements stored in the predetermined data format and (ii) locations and formats in which corresponding elements are stored in server environments having the one or more characteristics; and deploying, by one or more computers, server environment data derived from the data package to a second server environment at the destination, wherein deploying the server environment data comprises forming the identified dependencies of the first server environment in the second server environment based on the data package that specifies the dependencies identified in the first server environment, the server environment data being deployed to the second server environment by converting the data in the data package that is in the predetermined data format to a different format specified by the mapping data and storing the converted data at the second server environment at locations specified by the mapping data.

2. The method of claim 1, wherein the first server environment is provided by a first server system, and wherein the destination is a second server system that has one or more characteristics that are different from the first server system that provides the first server environment; and
wherein generating the data package and deploying the server environment data derived from the data package translates the configuration data from a form used in the first server system to a different form used by the second server system.

3. The method of claim 2, wherein the one or more characteristics of the second server system that are different from the first server system comprise a different hardware configuration, a different network topology, a different server type, a different operating system, or a different software version.

4. The method of claim 1, wherein generating the data package comprises rearranging the data from the first server environment to conform to the predetermined data format used to stored data in the data package.

5. The method of claim 1, comprising:
obtaining data indicating one or more characteristics of the first server environment; and
selecting, from among multiple sets of mapping data, a set of mapping data that maps elements of the first server environment to the predetermined data format;
wherein generating the data package comprises using the selected set of mapping data to convert the data from the first server environment to a standardized form in the data package.

6. The method of claim 5, wherein the multiple sets of mapping data each correspond to a different software version, the sets of mapping data respectively indicating a correspondence of data for the corresponding software versions and a same standardized arrangement of data.

7. The method of claim 1, wherein generating the data package comprises:
identifying one or more non-standard characteristics of the first server environment by comparing the configuration data indicating the configuration of the first server environment with reference configuration data a configuration of a reference server environment; and
specifying the identified one or more non-standard characteristics of the first server environment in the data package; and
wherein deploying the server environment data comprises replicating the identified one or more non-standard characteristics of the first server environment in the second server environment using configuration settings determined based on the data package.

8. The method of claim 1, wherein the one or more characteristics of the destination comprise one or more of an operating system, a build version of an enterprise application, a processor type, a processor configuration, a network topology, a storage configuration, or an application programming interface.

9. The method of claim 1, wherein generating the data package comprises:
comparing settings of the first server environment to a set of reference settings; and
selectively storing settings of the first server environment in the data package based on the comparison by (i) storing, in the data package, settings identified as different from the corresponding settings in the set of reference settings and (ii) omitting from the data package one or more settings that are not identified as different from the corresponding settings in the set of reference settings.

10. The method of claim 1, wherein generating the data package comprises generating a ledger of elements of an application of the first server environment that are different from a reference configuration of the application.

11. A system comprising:
one or more computers; and
one or more non-transitory computer-readable media storing instructions that, when executed, cause the one or more computers to perform operations comprising:
obtaining data from a first server environment, the data comprising configuration data indicating a configuration of the first server environment, data objects used by the first server environment, and at least some metadata corresponding to one or more of the data objects;
identifying, by the one or more computers, dependencies among software of the first server environment;
generating, by one or more computers, a data package for the first server environment by selectively including data from the first server environment in the data package while excluding at least some software of the first server environment from the data package, wherein the data package specifies the identified dependencies among software of the first server environment and includes the configuration data, the data objects, and the at least some metadata, wherein generating the data package comprises converting the data from the first server environment to a predetermined data format;
receiving, by one or more computers, data indicating (i) a destination on which to deploy the data from the first server environment in the generated data package and (ii) one or more characteristics of the destination;
accessing, by one or more computers, mapping data that specifies how to convert between (i) locations and formats for a set of elements stored in the predetermined data format and (ii) locations and formats in which corresponding elements are stored in server environments having the one or more characteristics; and
deploying, by one or more computers, server environment data derived from the data package to a second server environment at the destination, wherein deploying the server environment data comprises forming the identified dependencies of the first server environment in the second server environment based on the data package that specifies the dependencies identified in the first server environment, the server environment data being deployed to the second server environment by converting the data in the data package that is in the predetermined data format to a different format specified by the mapping data and storing the converted data at the second server environment at locations specified by the mapping data.

12. One or more non-transitory computer-readable media storing instructions that, when executed by one or more computers, cause the one or more computers to perform operations comprising:
- obtaining data from a first server environment, the data comprising configuration data indicating a configuration of the first server environment, data objects used by the first server environment, and at least some metadata corresponding to one or more of the data objects;
- identifying, by the one or more computers, dependencies among software of the first server environment;
- generating, by one or more computers, a data package for the first server environment by selectively including data from the first server environment in the data package while excluding at least some software of the first server environment from the data package, wherein the data package specifies the identified dependencies among software of the first server environment and includes the configuration data, the data objects, and the at least some metadata, wherein generating the data package comprises converting the data from the first server environment to a predetermined data format;
- receiving, by one or more computers, data indicating (i) a destination on which to deploy the data from the first server environment in the generated data package and (ii) one or more characteristics of the destination;
- accessing, by one or more computers, mapping data that specifies how to convert between (i) locations and formats for a set of elements stored in the predetermined data format and (ii) locations and formats in which corresponding elements are stored in server environments having the one or more characteristics; and
- deploying, by one or more computers, server environment data derived from the data package to a second server environment at the destination, wherein deploying the server environment data comprises forming the identified dependencies of the first server environment in the second server environment based on the data package that specifies the dependencies identified in the first server environment, the server environment data being deployed to the second server environment by converting the data in the data package that is in the predetermined data format to a different format specified by the mapping data and storing the converted data at the second server environment at locations specified by the mapping data.

13. The method of claim 1, wherein converting the data from the first server environment to a predetermined data format comprises converting configuration settings of the first server environment to platform-independent parameters stored in the data package;
- wherein the destination is a destination server system;
- wherein the one or more characteristics comprise platform-specific characteristics of the destination server system including at least one of an operating system of the destination server system, a software version for software on the destination server system, or hardware configuration of the destination server system;
- wherein converting the data in the data package that is in the predetermined data format to a different format at the destination in a manner specified by the mapping data comprises using the mapping data to convert the platform-independent parameters stored in the data package into platform-specific settings for the destination server system that are stored at the destination server system to adjust operation of the second server environment.

14. The method of claim 1, further comprising identifying links existing between data objects found in the first server environment; and
- wherein deploying the server environment data further comprises establishing links between the data objects for the locations that the data objects are placed in the second server environment.

15. The method of claim 1, wherein receiving the data indicating the destination comprises receiving data indicating user input specifying a user-selected destination computing system; and
- wherein deploying the server environment data comprises creating the second server environment as a new server environment at the user-selected destination computing system.

16. The method of claim 1, wherein deploying the server environment data comprises selectively transferring only a subset of the data in the data package to the second server environment at the destination.

17. The method of claim 1, comprising:
- identifying, from among sets of rules that respectively correspond to different destinations, a set of rules configured to verify compatibility with requirements of the destination; and
- applying the rules in the identified set of rules to verify compatibility of settings converted using the mapping data with requirements of the second server environment.

18. The method of claim 1, wherein deploying the server environment data comprises:
- determining that configuration information needed for the second server environment is not included in the data package or that configuration information in the data package is invalid for the second server environment; and
- based on the determination, applying default configuration information for the second server environment instead of configuration information converted from the data package.

19. The method of claim 1, comprising, generating a set of deployment instructions that specify operations to create the second server environment at the destination, run a software installer to install software for the second server environment, and form the identified dependencies of the first server environment in the second server environment; and
- sending the set of deployment instructions to the destination such that the destination performs the specified operations to create and configure the second server environment.

20. The method of claim 1, comprising storing multiple sets of mapping data that each correspond to different characteristics of servers or server environments;
- wherein accessing the mapping data comprises:
  - based on the one or more characteristics of the destination, selecting a set of mapping data, from among multiple sets of mapping data, that corresponds to the one or more characteristics of the destination; and
- wherein deploying the server environment data comprises:
  - converting the data in the data package to a format specified by the selected set of mapping data and storing the converted data in the second server environment at locations specified by the selected set of mapping data.

* * * * *